United States Patent
Tateishi et al.

(10) Patent No.: US 8,236,065 B2
(45) Date of Patent: *Aug. 7, 2012

(54) AZO PIGMENT, PROCESS FOR PRODUCING AZO PIGMENT, DISPERSION CONTAINING AZO PIGMENT, AND COLORING COMPOSITION

(75) Inventors: Keiichi Tateishi, Kanagawa (JP); Yoshiaki Nagata, Kanagawa (JP); Shinya Hayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/133,707

(22) PCT Filed: Dec. 8, 2009

(86) PCT No.: PCT/JP2009/070510
§ 371 (c)(1),
(2), (4) Date: Jun. 9, 2011

(87) PCT Pub. No.: WO2010/067784
PCT Pub. Date: Jun. 17, 2010

(65) Prior Publication Data
US 2011/0245475 A1  Oct. 6, 2011

(30) Foreign Application Priority Data
Dec. 9, 2008 (JP) .................. 2008-313753
Dec. 7, 2009 (JP) .................. 2009-278056

(51) Int. Cl.
*C09B 67/00* (2006.01)

(52) U.S. Cl. .......... 8/637.1; 8/639; 8/662; 8/688; 8/690; 8/692; 8/693

(58) Field of Classification Search .................. 8/637.1, 8/639, 662, 688, 690, 692, 693
See application file for complete search history.

(56) References Cited

U.S. PATENT DOCUMENTS
8,062,383 B2 * 11/2011 Tateishi .................. 8/637.1
(Continued)

FOREIGN PATENT DOCUMENTS
JP  58-210084 A  12/1983
(Continued)

OTHER PUBLICATIONS
STIC Search Report dated Aug. 11, 2011.*
(Continued)

*Primary Examiner* — Eisa Elhilo
(74) *Attorney, Agent, or Firm* — Sughrue Mion, PLLC

(57) ABSTRACT

There is provided an azo pigment having excellently good color reproducibility, dispersibility, and storage stability of pigment dispersions and having excellent hue and tinctorial strength. An azo pigment represented by the following formula (1) and having characteristic peaks at Bragg angles (2θ±0.2°) of 7.2°, 13.4°, 15.0° and 25.9° in X-ray diffraction with characteristic Cu Kα line, and a tautomer thereof:

Formula (1):

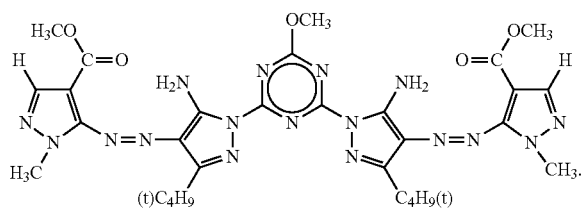

9 Claims, 7 Drawing Sheets

U.S. PATENT DOCUMENTS

2006/0107868 A1     5/2006    Potenza et al.
2008/0058531 A1     3/2008    Schmidt et al.

FOREIGN PATENT DOCUMENTS

| | | |
|---|---|---|
| JP | 05-222314 A | 8/1993 |
| JP | 08-048908 A | 2/1996 |
| JP | 2003-277662 A | 10/2003 |
| JP | 2006-057076 A | 3/2006 |
| JP | 2007-063520 A | 3/2007 |
| JP | 2007-217681 A | 8/2007 |
| JP | 2007-302810 A | 11/2007 |
| JP | 2007302810 * | 11/2007 |
| WO | 2009-110557 A1 | 9/2009 |
| WO | 2009-110558 A1 | 9/2009 |

OTHER PUBLICATIONS

English Abstract of the Japanese Patent No. JP 2007302810 A, dated Nov. 2007.*
ISR (PCT/ISA/210) issued Jan. 19, 2010, in PCT/JP2009-070510.
Written Opinion (PCT/ISA/237) issued Jan. 19, 2010, in PCT/JP2009-070510.

* cited by examiner

AZO PIGMENT, PROCESS FOR PRODUCING AZO PIGMENT, DISPERSION CONTAINING AZO PIGMENT, AND COLORING COMPOSITION

This application is based on a Japanese Patent application filed on Dec. 9, 2008 (Japanese Patent Application No. 2008-313753) and a Japanese Patent Application filed on Dec. 7, 2009 (Japanese Patent Application No. 2009-278056), and the contents thereof are incorporated herein by reference.

TECHNICAL FIELD

The present invention relates to an azo pigment, a process for producing the azo pigment, a dispersion containing the azo pigment, and a coloring composition containing the azo pigment.

BACKGROUND ART

In recent years, as image-recording materials, materials for forming color images have been particularly predominant and, specifically, recording materials for an inkjet system, recording materials for a thermal transfer system, recording materials for an electrophotographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, a pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular mutual action, both of them are in a trade-off relation with each other, thus being difficult to allow them to be compatible with each other.

Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable.

That is, in comparison with a dye which is required to have properties as dye molecules, the pigment is required to have more properties, i.e., it is required to satisfy all of the above-mentioned requirements as a solid of an aggregate of a colorant (dispersion of fine particles) as well as the properties as molecules of a coloring material. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than $1/10$ of the number of dyes.

In particular, azo pigments have high lightness and are excellent in light fastness and heat fastness, and hence they have widely been used as pigments for use in printing inks, inks for an inkjet system, electrophotographic materials, and color filters. And, with expansion of use, pigments have been required to have higher stability with time in a medium in which they are used than the level of commonly used ones used in printing inks, gravure inks, and coloring materials.

On the other hand, many of typical organic pigments are polymorphic and, in spite of having the same chemical formulation, such pigments are known to take two or more crystal forms.

Of organic pigments, some organic pigments such as azo pigments can form fine and size distribution-controlled particles by selecting appropriate reaction conditions upon synthesis thereof, and there are pigments such as copper phthalocyanine green which are formed into pigments by allowing extremely fine and aggregated particles produced upon synthesis to grow in a subsequent step with size distribution being controlled, and pigments such as copper phthalocyanine blue pigment which are formed into pigments by pulverizing coarse and uneven particles produced upon synthesis in a subsequent step and controlling the size distribution. For example, a diketopyrrolopyrrole pigment is generally synthesized by reacting a succinic diester with an aromatic nitrile in an organic solvent (see, for example, patent document 1). The crude diketopyrrolopyrrole pigment is heat-treated in water or in an organic solvent, and then subjected to pulverization such as wet milling into a form appropriate for use (see, for example, patent document 2). With C.I. Pigment Red 254, an α-type crystal form and a β-type crystal form are known (see, for example, patent document 3). Also, with an azo pigment of C.I. Pigment Yellow 181, several crystal forms are known (see, for example, patent document 4).

PRECEDING TECHNICAL DOCUMENTS

Patent Documents

Patent document 1: JP-A-58-210084
Patent document 2: JP-A-5-222314
Patent document 3: JP-A-8-48908
Patent document 4: US Patent Application Publication No. 2008/0058531

SUMMARY OF THE INVENTION

Problems that the Invention is to Solve

The present invention relates to an azo pigment wherein pyrazole rings each having a specific substituent are connected to each other through azo groups and a triazine ring and which has a novel crystal form, with the excellent performance and production process thereof not having been known so far.

In an embodiment of the invention, an object of the invention is to provide an azo pigment having extremely excellent color reproducibility, dispersibility, and storage stability of pigment dispersions and having excellent hue and tinctorial strength.

Preferably, an object of the invention is to provide an azo pigment which has a long axis length of from 0.01 µm to 10 µm when observed under a transmission microscope.

Another object of the invention is to provide a coloring composition containing the azo pigment.

Also, a further object of the invention is to provide a process for producing the azo pigment, which enables production of the azo pigment with good reproducibility and high efficiency while controlling so as to obtain specific structural isomerization and crystal polymorphism.

A still further object of the invention is to provide a coloring composition containing the dispersion of the azo pigment.

Means for Solving the Problem

As a result of intensive investigations in consideration of the above-mentioned circumstances, the inventors have found that an azo pigment having characteristic X ray diffraction peaks at specific positions shows extremely good color reproducibility, dispersibility, and storage stability of pigment dispersions and has excellent hue and tinctorial strength. Also, the inventors have found that a coloring composition containing dispersed therein the pigment has excellent color reproducibility and enables to produce an ink for inkjet recording which shows good storage stability of pigment dispersions and ink liquid stability with respect to pigment particle size with the lapse of time.

Further, the inventors have found a process for producing an azo pigment with good reproducibility and high efficiency while controlling so as to obtain specific structural isomerization and crystal polymorphism, thus having completed the invention.

That is, the invention is as follows.

[1] An azo pigment which is represented by the following formula (1) and having characteristic peaks at Bragg angles (2θ±0.2°) of 7.2°, 13.4, 15.0°, and 25.9 in X-ray diffraction with characteristic Cu Kα line, or a tautomer thereof:

Formula (1):

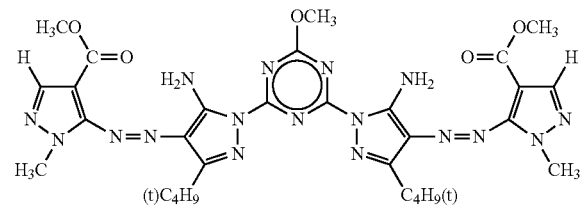

[2] A process for producing an azo pigment represented by the following formula (1) or a tautomer thereof; including conducting diazo coupling reaction between a diazonium salt derived from a heterocyclic amine represented by the following formula (2) and a compound represented by the following formula (3):

Formula (2):

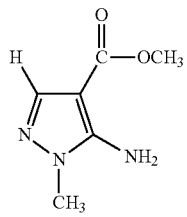

Formula (3):

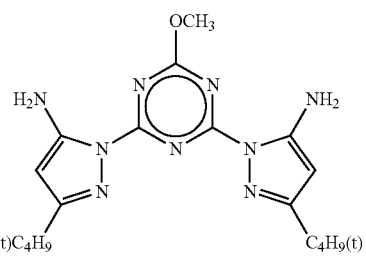

Formula (1):

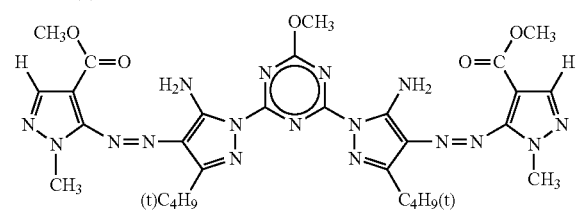

[3] The production process described in [2], further including conducting after-treatment.

[4] The production process described in [2], wherein the azo pigment obtained by the production process described in [2] is successively subjected to an after-treatment without isolation.

[5] The azo pigment described in [1], which is produced by the production process described in [2], [3], or [4].

[6] A pigment dispersion which contains an azo pigment described in [1] or [5].

[7] The pigment dispersion described in [6], wherein the azo pigment particles in the pigment dispersion has a volume-average particle size of from 0.01 µm to 0.15 µm.

[8] A coloring composition which contains an azo pigment described in [1] or [5], or contains a pigment dispersion described in [6] or [7].

Advantages of the Invention

According to the present invention, there is provided an azo pigment having excellent coloring characteristics such as tinctorial strength and excellent stability with time with respect to particle size of the pigment, and having excellent storage stability of pigment dispersions and excellent ink liquid stability. A pigment dispersion having excellent coloring characteristics, storage stability of dispersions, and ink liquid stability can be obtained by dispersing the pigment of the invention in various media. The pigment dispersion can be used for, for example, an ink for printing such as inkjet printing, a color toner for electrophotography, a display such as LCD or PDP, a color filter to be used in photographing equipment such as CCD, a paint, and a colored plastic.

MODE FOR CARRYING OUT THE INVENTION

Figure 1:
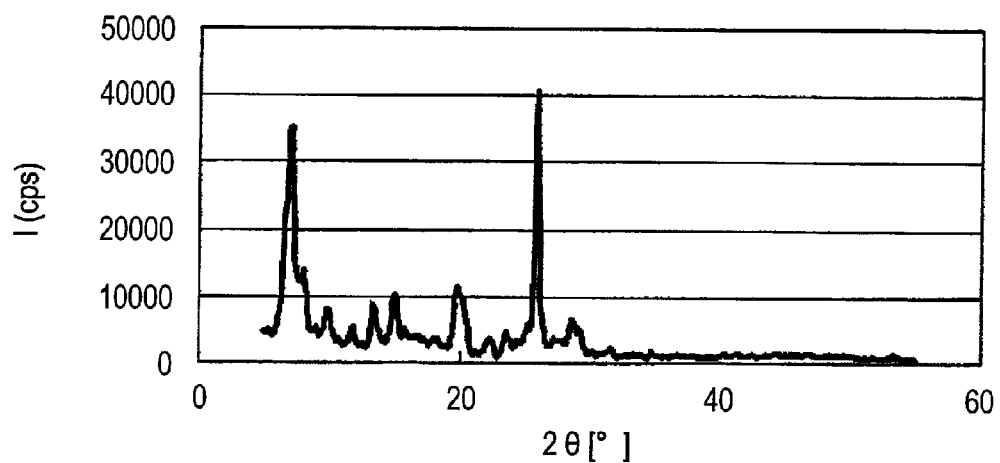
FIG. 1 is an X-ray diffraction pattern of a crude pigment (1-2) synthesized according to Synthesis Example 1-1.

The present invention will be described in detail below.

The azo pigment of the invention or tautomer thereof may be a hydrate, a solvate, or a salt thereof.

The azo pigment in an embodiment of the invention is an azo pigment represented by the following formula (1) and having characteristic peaks at Bragg angles (2θ±0.2°) of 7.2°, 13.4°, 15.0° and 25.9 in X-ray diffraction with characteristic Cu Kα line, or a tautomer thereof.

Formula (1):

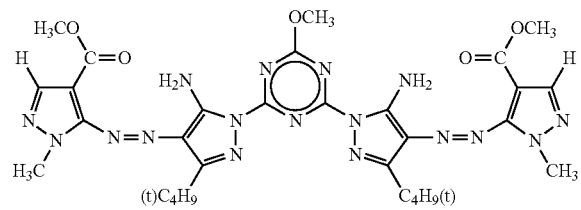

In this specification, the azo pigment represented by the above formula (1) and having characteristic peaks at Bragg angles (2θ±0.2°) of 7.2°, 13.4°, 15.0°, and 25.9 in X-ray diffraction with characteristic Cu Kα line will be hereinafter referred to as α-type crystal form azo pigment.

In the invention, the measurement of X-ray diffraction of the α-type crystal form azo pigment represented by the above formula (1) is conducted according to Japanese Industrial Standards JISK0131 (General Rule of X-ray diffractiometry) using a powder X-ray diffractometer, RINT 2500 (manufactured by Rigaku Industrial Corp.).

In the case where the azo pigment is in a single crystal form, distance between molecules is so close that intermolecular action becomes strong. As a result, the pigment shows an increased solvent resistance, an increased heat stability, an increased light fastness, an increased resistance to gases, and an increased print density and, further, an expanded color reproducible region. Therefore, the azo pigment represented by the formula (1) and the tautomer thereof are preferably in a crystal form having characteristic X-ray diffraction peaks at Bragg angles (2θ±0.2°) of 7.2° and 25.9° with characteristic Cu Kα line.

The crystal form having characteristic X-ray diffraction peaks at 7.2°, 13.4°, 15.0°, and 25.9° is more preferably a crystal form having characteristic X-ray diffraction peaks at 7.2°, 13.4°, 15.0°, 19.8°, and 25.9°. Of the crystal forms, a crystal form having characteristic X-ray diffraction peaks at 7.2°, 8.2°, 10.0°, 13.4°, 15.0°, 19.8°, and 25.9° is most preferred.

In the case where the length of the long axis of the primary particles observed under a transmission microscope is 0.01 μm or less, fastness to light or to ozone might be seriously reduced in some cases, or there might result poor dispersibility in some cases due to aggregation liability. On the other hand, in the case where the length is 10 μm or more, there might result an overdispersion state upon dispersing the particles to attain desired volume-average particle size, thus aggregation becoming easy to occur, leading to poor storage stability of the pigment dispersion.

When the length of the primary particles in the long axis direction is controlled within the above-described range, there results high fastness to light or to ozone, and the pigment dispersion has excellent storage stability, thus such pigment particles being preferred.

Therefore, the length of the long axis of the primary particles of the α-type crystal form azo pigment represented by the above formula (1) observed under a transmission microscope is preferably from 0.01 μm to 10 μm, more preferably from 0.02 μm to 5 μm, most preferably from 0.03 μm to 3 μm.

Synthesis of the α-type crystal form azo pigment represented by the above formula (1) will be described in detail below.

The α-type crystal form azo pigment represented by formula (1) (hereinafter also referred to merely as "azo pigment" or "pigment" in some cases) can be synthesized by the production process of the invention.

The production process of the invention includes a step of conducting azo coupling reaction between a diazonium salt derived from a heterocyclic amine represented by the following formula (2) and a compound represented by the following formula (3).

Formula (2):

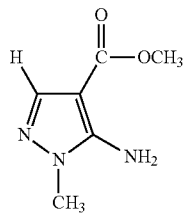

Formula (3):

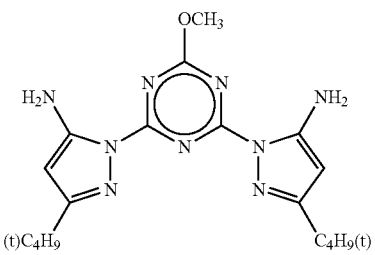

Formula (1):

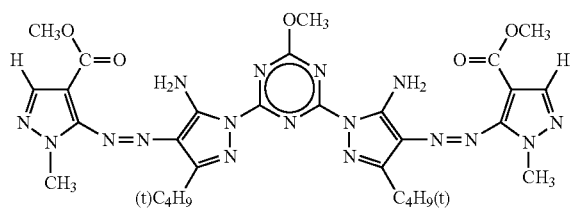

Preparation of the Diazonium Salt and Coupling Reaction Between the Diazonium Salt and the compound represented by formula (3) can be conducted in a conventional manner.

For preparation of the diazonium salt of the heterocyclic amine represented by formula (2), there may be applied, for example, a conventional process for preparing a diazonium salt using a nitrosonium ion source such as nitrous acid, nitrite or nitrosylsulfuric acid in a reaction medium containing an acid (for example, hydrochloric acid, sulfuric acid, acetic acid, propionic acid, methanesulfonic acid, or trifluoromethanesulfonic acid).

As examples of more preferred acids, there are illustrated acetic acid, propionic acid, methanesulfonic acid, phosphoric acid, and sulfuric acid, which may be used alone or in combination thereof. Of these, a combination of phosphoric acid and sulfuric acid, a combination of acetic acid and sulfuric acid, a combination of acetic acid and propionic acid, and a combination of acetic acid, propionic acid, and sulfuric acid are more preferred, with a combination of acetic acid and propionic acid and a combination of acetic acid, propionic acid, and sulfuric acid being particularly preferred.

As preferred examples of the reaction medium (solvent), organic acids and inorganic acids are preferred for use and, in particular, phosphoric acid, sulfuric acid, acetic acid, propionic acid, and methanesulfonic acid are preferred, with acetic acid and/or propionic acid being particularly preferred.

As a preferred example of the nitrosonium ion source, there are illustrated nitrous acid esters, nitrites, nitrosylsulfuric acid, etc. Of these, isopentyl nitrite, sodium nitrite, potassium nitrite, and nitrosylsulfuric acid are more preferred, and use of sodium nitrite or nitrosylsulfuric acid is particularly preferred. For example, use of nitrosylsulfuric acid in a reaction medium containing the above-described preferred acid enables preparation of a diazonium salt with stability and efficiency.

The amount of the solvent to be used is preferably from 0.5- to 50-fold amount by weight, more preferably from 1- to 20-fold amount by weight, particularly preferably from 3- to 15-fold amount by weight, based on the amount of a diazo component of formula (2).

In the invention, the diazo component of formula (2) may be in a state of being dispersed in the solvent or, with some kinds of the diazo components, in a state of a solution.

The amount of the nitrosonium ion source to be used is preferably from 0.95 to 5.0 mol equivalent weight, more preferably from 1.00 to 3.00 mol equivalent weight, particularly preferably from 1.00 to 1.10 equivalent weight, with respect to the diazo component.

The reaction temperature is preferably from $-15°$ C. to $40°$ C., more preferably from $-5°$ C. to $35°$ C., still more preferably from $-0°$ C. to $30°$ C. When the reaction temperature is lower than $-15°$ C., the reaction rate becomes seriously small, and the time required for the synthesis become seriously prolonged, thus such temperature not being economically advantageous and, when the synthesis is conducted at a temperature higher than $40°$ C., the amount of produced by-products is increased, thus such temperature not being preferred.

The reaction time is preferably from 30 minutes to 300 minutes, more preferably from 30 minutes to 200 minutes, still more preferably from 30 minutes to 150 minutes.

The compound represented by formula (3) can be produced by a process described in, for example, JP-A-2006-265185.

[Coupling Reaction Step]

The coupling reaction step can be conducted in an acidic reaction medium to a basic reaction medium. Preferably, however, for the azo pigment of the invention, the coupling reaction step is conducted in an acidic to neutral reaction medium. In particular, when conducted in an acidic reaction medium, the coupling reaction gives an azo pigment with good efficiency without decomposition of the diazonium salt.

As preferred examples of the reaction medium (solvent), water, organic acids, inorganic acids, and organic solvents may be used, with organic solvents being particularly preferred. Those solvents are preferred which, upon reaction, do not cause liquid separation phenomenon but form a uniform solution with the solvent. Examples thereof include water; alcoholic organic solvents such as methanol, ethanol, propanol, isopropanol, butanol, t-butyl alcohol, and amyl alcohol; ketone series organic solvents such as acetone and methyl ethyl ketone; diol series organic solvents such as ethylene glycol, diethylene glycol, triethylene glycol, propylene glycol, dipropylene glycol, and 1,3-propanediol; ether series organic solvents such as ethylene glycol monomethyl ether, ethylene glycol monoethyl ether, and ethylene glycol diethyl ether; tetrahydrofuran; dioxane; and acetonitrile. These solvents may be a mixture of two or more thereof.

Organic solvents having a polarity parameter (ET) of 40 or more are preferred. Of them, glycol series solvents having two or more hydroxyl groups in the molecule thereof, alcoholic solvents containing 3 or less carbon atoms, and ketone series solvents containing a total of 5 or less carbon atoms are more preferred, with alcoholic solvents containing 2 or less carbon atoms (for example, methanol and ethylene glycol) and ketone series solvents containing a total of 4 or less carbon atoms (for example, acetone and methyl ethyl ketone) being still more preferred. Mixed solvents thereof are also included.

The amount of the solvent to be used is preferably from 1- to 100-fold amount by weight, more preferably from 1- to 50-fold amount by weight, still more preferably from 2- to 30-fold amount by weight, based on the coupling component represented by the above formula (3).

In the invention, the coupling component of formula (3) may be in a state of being dispersed in the solvent or, with some kinds of the coupling components, in a state of a solution.

The amount of the coupling component to be used is preferably from 0.95 to 5.0 equivalent weight, more preferably from 1.00 to 3.00 equivalent weight, particularly preferably from 1.00 to 1.50 equivalent weight, with respect to the diazo coupling moiety.

The reaction temperature is preferably from −30° C. to 50° C., more preferably from −15° C. to 45° C., still more preferably from −10° C. to 40° C. In case when the reaction temperature is lower than −30° C., the reaction rate becomes so small that the time required for the synthesis becomes seriously prolonged, thus such temperature not being preferred in view of production cost whereas, in case when the synthesis is conducted at a temperature higher than 50° C., the amount of produced by-products is increased, thus such temperature not being preferred. Also, in case when the temperature is low, the primary particle size becomes small and, in some cases, there might occur problems such as filtration leakage, which makes isolation difficult. On the other hand, when the reaction temperature is high, the primary particle size becomes large, which facilitates isolation without causing the problems such as filtration leakage. However, the pigment dispersion becomes liable to aggregate and, in some cases, an after-treatment such as salt-milling becomes necessary.

The reaction time is preferably from 30 minutes to 300 minutes, more preferably from 30 minutes to 200 minutes, still more preferably from 30 minutes to 150 minutes.

In the process of the invention for synthesizing the azo pigment, the product obtained by these reactions (crude azo pigment) may be used after being treated according to an after-treatment for common organic synthesis reactions and after or without being purified.

That is, for example, a product isolated from the reaction system may be used without purification or after being subjected to purifying through a single operation of, or a combination of, recrystallization, salt formation, etc.

Also, after completion of the reaction, the reaction solvent may or may not be distilled off, the reaction product may be poured into water or ice-water, the resulting solution may or may not be neutralized, and the liberated portion or the extract obtained by extracting with an organic solvent/water solution may or may not be purified through a single operation of, or a combination of, recrystallization, crystallization, salt formation, etc. to use.

Also, after completion of the reaction, the reaction product may be poured into water or ice-water without distilling off the solvent, and the precipitated solid product may be sediment after or without neutralization, followed by purification by decantation to use.

The process for synthesizing the azo pigment of the invention will be described in more detail below.

A process for producing the azo pigment of the invention is characterized by conducting a coupling reaction between a diazonium compound prepared by diazotizing a heterocyclic amine represented by the above formula (2) and a compound represented by the above formula (3) after dissolving or suspending the compound of formula (3) in an organic solvent.

The diazotization reaction of the heterocyclic amine represented by the above formula (2) may be conducted by, for example, reacting the amine with a reagent such as sodium nitrite or nitrosylsulfuric acid in an acidic solvent such as sulfuric acid, phosphoric acid, or acetic acid at a temperature of 30° C. or lower than that for a period of from about 10 minutes to about 6 hours. The coupling reaction is conducted preferably by reacting the diazonium salt obtained by the above-described process with the compound represented by the above formula (3) at 50° C. or lower than that, preferably 40° C. or lower than that, for a period of from about 10 minutes to about 12 hours.

The above-described control of tautomerization and/or polymorphism can be attained through production conditions upon coupling reaction. As a process for producing α-type crystals of the invention which is a more preferred embodiment, it is preferred to employ, for example, a process of the invention wherein the coupling reaction is conducted after once dissolving the compound represented by the above formula (3) in an organic solvent. As the organic solvent which can be used here, there are illustrated, for example, alcoholic solvents and ketone series solvents. As the alcoholic solvents, methanol, ethanol, isopropanol, ethylene glycol, and diethylene glycol are preferred. Of these, methanol is particularly preferred. As the ketone series solvents, acetone, methyl ethyl ketone, and cyclohexanone are preferred. Of these, acetone is particularly preferred. In the case of using these solvents, it may be a mixed solvent with water.

Another process for producing the azo pigment of the invention is characterized by conducting the coupling reaction between a diazonium compound prepared by diazotizing a heterocyclic amine represented by the foregoing formula (2) and a compound represented by the foregoing formula (3) in the presence of a polar aprotic solvent.

The α-type crystals can also be produced with good efficiency by conducting the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, acetone, methyl ethyl ketone, acetonitrile, and a mixed solvent thereof. Of these solvents, acetone, methyl ethyl ketone, N,N-dimethylacetamide, and acetonitrile are particularly preferred. In the case of using these solvents, the compound of the above formula (3) may or may not be completely soluble in the solvent.

The compound obtained by the above-described production process may or may not be subjected to adjustment of pH by adding a base as a purifying step according to use. In the case of adjusting pH, the pH is preferably from 4 to 10. Of them, a pH of from 4.5 to 8 is more preferred, with a pH of 5.5 to 7 being particularly preferred.

When the pH is 10 or less than that, the resulting hue does not give an increased reddish tone, thus such pH being preferred in view of hue. When the pH is 4 or more, there scarcely occurs a problem of, for example, corrosion of a nozzle in the case of being used as an ink for inkjet recording, thus such pH being preferred.

The above-described production process gives the compound represented by the above formula (1) as a crude azo pigment (crude).

The invention also relates to an α-type crystal form azo pigment produced by the above-described production process.

[After-Treating Step]

In the production process of the invention, the production process preferably includes a step of conducting after-treatment. In the invention, the term "after-treatment step" means a step of solvent-heating treatment for controlling pigment particle size. This after-treatment enables unification of crystal form, and size and form of particles.

Also, in the production process of the invention, it is preferred to include a step of successively conducting the after-treatment without isolating the resulting azo pigment. Since the production process of the invention can provide an azo pigment having high quality in high yield, the product can be successively subjected to the after-treatment, which serves to decrease the number of necessary steps.

As a solvent to be used in the solvent-heating treatment, there are illustrated, for example, water; aromatic hydrocarbon series solvents such as toluene and xylene; halogenated hydrocarbon series solvents such as chlorobenzene and o-dichlorobenzene; alcoholic solvents such as methanol, isopropanol, and isobutanol; polar aprotic organic solvents such as N,N-dimethylformamide, N-methyl-2-pyrrolidone, acetone, methyl ethyl ketone, and acetonitrile; glacial acetic acid; pyridine; and a mixture thereof. An inorganic or organic acid or base may further be added to the above-illustrated solvents.

The temperature of the solvent heating treatment varies depending upon the desired primary particle size of the pigment, but is preferably from 40 to 150° C., more preferably from 60 to 100° C. Also, the treating time is preferably from 30 minutes to 24 hours.

[Pigment Dispersion]

The pigment dispersion of the invention is characterized in that it contains at least one of the azo pigments of the invention. Thus, there can be obtained a pigment dispersion having excellent coloring characteristics, durability, and storage stability of dispersions.

The pigment dispersion of the invention may be aqueous or non-aqueous, but is preferably an aqueous pigment dispersion. As the aqueous liquid for dispersing the pigment in the aqueous pigment dispersion of the invention, a mixture containing water as a major component and, as needed, a hydrophilic organic solvent can be used. Examples of the aforesaid hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use. Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention includes the pigment represented by the foregoing formula (1) dispersed in a non-aqueous vehicle. Examples of resins to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photo-curable resin as the non-aqueous vehicle.

Also, examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

The pigment dispersion of the invention is obtained by dispersing the above-described azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), a ultrasonic wave system, a high-pressure emulsion dispersion system (high-pressure homogenizer; specific commercially available apparatuses being Gaulin homogenizer, a microfluidizer, and DeBEE2000).

In the invention, the volume-average particle size of the pigment is preferably from 0.01 μm to 0.15 μm.

When the volume-average particle size of the particles in the pigment dispersion is 0.01 μm or more, stability with time of the dispersion is increased, an aggregation scarcely occurs, thus such particle size being preferred. Also, when the volume-average particle size is 0.15 μm or less, there result an increased optical density, density of printed products is increased, color reproducibility of a color-mixing portion where, for example, red and green colors are mixed, transparency is enhanced, and clogging of nozzles scarcely occurs upon printing by means of an inkjet system, thus such particle size being preferred.

Additionally, the term "volume-average particle size of the pigment particles" means the particle size of the pigment itself or, in the case where an additive such as a dispersing agent is adhered to the coloring material, means the size of the particle with the additive being adhered thereto. In the invention, as an apparatus for measuring the volume-average particle size of the pigment, a particle size analyzer of Nanotrac UPA (UPA-EX150; manufactured by Nikkiso Co., Ltd.) is used. The measurement is conducted according to a predetermined measuring method by placing 3 ml of a pigment dispersion in a measuring cell. Additionally, with respect to parameters to be inputted upon measurement, an ink viscosity is used as a viscosity, and a pigment density is used as a density of the dispersed particles.

The volume-average particle size is more preferably from 20 nm to 150 nm, still more preferably from 30 nm to 130 nm, most preferably from 50 nm to 100 nm.

In order to adjust the volume-average particle size of the α-type crystal form azo pigment to the above-described range, the following methods may, for example, be employed. 0.25 part of the azo pigment, 0.05 part of sodium oleate, 0.5 part of glycerin, and 4.2 parts of water are mixed with each other, followed by dispersing for 1 hour and 30 minutes at a speed of 300 rotations per minute using a planetary ball mill containing 10 parts of zirconia beads of 0.1 mm in diameter, whereby the volume-average particle size can fall within the range of from 0.06 to 0.10 μm (60 nm to 100 nm). Also, when the dispersing procedure is conducted for 3 hours, the volume-average particle size can fall within the range of from 0.04 to 0.07 μm (40 nm to 70 nm). Also, when the dispersing procedure is conducted for 4 hours, the volume-average particle size can fall within the range of from 0.03 to 0.06 μm (30 nm to 60 nm).

The content of the pigment contained in the pigment dispersion of the invention is preferably in the range of from 1 to 35% by weight, more preferably in the range of from 2 to 25% by weight. In case when the content is less than 1% by weight, a sufficient image density might not be obtained in some cases by using the pigment dispersion independently as an ink. In case when the content exceeds 35% by weight, storage stability of dispersions might be reduced in some cases.

As uses of the azo pigments of the invention, there are illustrated image recording materials for forming images, particularly color images. Specifically, there are illustrated inkjet system recording materials to be described in detail below, heat-sensitive recording materials, pressure-sensitive recording materials, recording materials for the electro-photographic system, transfer system silver halide light-sensitive materials, printing inks, and recording pens, preferably inkjet system recording materials, heat-sensitive recording materials, and recording materials for the electro-photographic system, more preferably inkjet system recording materials.

In addition, the pigment can find application to color filters for recording and reproducing color images to be used in solid state imaging devices such as CCDs and in displays such as LCD and PDP and to a pigmenting solution for pigmenting various fibers.

The azo pigment of the invention may be used in an emulsion dispersion state or in a solid dispersion state according to the system wherein it is used.

[Coloring Composition]

The coloring composition of the invention means a coloring composition containing at least one azo pigment of the invention. The coloring composition of the invention can contain a medium and, in the case where a solvent is used as the medium, the composition is particularly appropriate as an ink for inkjet recording. The coloring composition of the invention can be prepared by using an oleophilic medium or an aqueous medium as the medium and dispersing the azo pigment of the invention in the medium. Preferred is the case of using the aqueous medium. The coloring composition of the invention includes a composition for an ink excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of water-soluble inks, these various additives are added directly to the ink solution. In the case of oil-soluble inks, it is general to add the additives to a dispersion after preparing the azo pigment dispersion, but they may be added to an oil phase or an aqueous phase upon preparation.

[Ink]

Next, the ink will be described below.

In the invention, the above-described pigment dispersion can be used in the ink, and the ink is preferably prepared by mixing with a water-soluble solvent, water, or the like. However, in the case where no particular problems are involved, the aforesaid pigment dispersion of the invention may be used as such.

The ink of the invention for inkjet recording contains the pigment dispersion of the invention, and the ink of the invention can also be used as an ink for inkjet recording.

Also, the coloring composition containing the pigment of the invention can preferably be used as an ink for inkjet recording.

[Ink for Inkjet Recording]

Next, the ink for inkjet recording will be described below.

The ink for inkjet recording (hereinafter also referred to as "ink" in some cases) contains the pigment dispersion described above, and is preferably prepared by mixing with a water-soluble solvent, water, or the like. However, in the case where no particular problems are involved, the aforesaid pigment dispersion of the invention described above may be used as such.

In consideration of hue, color density, saturation, and transparency of an image formed on a recording medium, the content of the pigment dispersion in the ink is in the range of preferably from 1 to 100% by weight, particularly preferably from 3 to 20% by weight, most preferably from 3 to 10% by weight.

The pigment of the invention is contained in an amount of preferably from 0.1 part by weight to 20 parts by weight, more preferably from 0.2 part by weight to 10 parts by weight, still more preferably from 1 to 10 parts by weight, in 100 parts by weight of the ink. The ink of the invention may further contain other pigment in combination with the pigment of the invention. In the case of using two or more kinds of pigments, the total amount of the pigments is preferably within the above-described range.

The ink can be used for forming a full-color image as well as a mono-color image. In order to form the full-color image, a magenta tone ink, a cyan tone ink, and a yellow tone ink can be used and, further, a black tone ink can be used for adjusting tone.

Further, in the ink of the invention may be used other pigments in addition to the azo pigment of the invention. As yellow pigments to be applied, there are illustrated, for example, C.I.P.Y.-74, C.I.P.Y.-128, C.I.P.Y.-155, and C.I.P.Y.-213. As magenta pigments to be applied, there are illustrated C.I.P.V.-19 and C.I.P.R.-122. As cyan pigments to be applied, there are illustrated C.I.P.B.-15:3 and C.I.P.B.-15:4. Apart from these pigments, any pigment may be used as each pigment. As a black color material, there can be illustrated a dispersion of carbon black as well as disazo, trisazo, and tetrazo pigments.

As the water-soluble solvents to be used in the ink, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylene glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate, ethylene carbonate, etc. may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer. Additionally, the above-described surface tension is measured under the environment of 23° C. and 55% RH by using a Wilhelmy surface tension balance as is the same as described above.

The viscosity of the ink is preferably from 1.2 mPa·s to 8.0 mPa·s, more preferably from 1.5 mPa·s to less than 6.0 mPa·s, still more preferably from 1.8 mPa·s to less than 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases.

Additionally, the above-described viscosity (including that to be described hereinafter) is measured by using a rotational viscometer Rheomat 115 (manufactured by Contraves Co.) at 23° C. and a shear rate of 1,400 s$^-$.

In addition to the above-mentioned individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the ink.

Further, for the purpose of controlling characteristic properties such as improvement of ejection properties, there can be used, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, fluorine-containing surfactants, and the like.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate.

Besides, pH buffers, antioxidants, antifungal agents, viscosity-adjusting agents, electrically conductive agents, ultraviolet ray absorbents, etc. may also be added as needed.

[Inkjet Recording Method, Inkjet Recording Apparatus, and Ink Tank for Inkjet Recording]

Inkjet recording method is a method of forming an image on the surface of a recording medium by using an ink for inkjet recording, and ejecting the ink onto the surface of the recording medium from a recording head according to record signals.

Also, an inkjet recording apparatus is an apparatus wherein an ink for inkjet recording is used and a recording head capable of ejecting the ink (if necessary, a processing solution) onto the surface of a recording medium is provided, with the ink being ejected onto the surface of the recording medium from the recording head to form an image. Additionally, the inkjet recording apparatus can feed the ink to the recording head, and may be equipped with an ink tank for inkjet recording (hereinafter also referred to as "ink tank" in some cases) which is removable from the main body of the inkjet recording apparatus. In this case, the ink is contained in the ink tank for inkjet recording.

As the inkjet recording apparatus, an ordinary inkjet recording apparatus equipped with a printing system capable of using an ink for inkjet recording can be utilized. In addition, there may be employed an inkjet recording apparatus having mounted thereon a heater or the like for controlling drying of the ink, or an inkjet recording apparatus equipped with a transfer mechanism which ejects (print) an ink and a processing solution onto an intermediate body, and then transfers the image on the intermediate body onto a recording medium such as paper.

Also, as the ink tank for inkjet recording, any conventionally known ink tank can be utilized as long as it is removable from the inkjet recording apparatus equipped with a recording head and has a constitution that it can feed, in a state of being mounted on the inkjet recording apparatus, an ink to a recording head.

In view of the effect of reducing blurring and inter-color bleeding, it is preferred to employ a thermal inkjet recording system or a piezo inkjet recording system as an inkjet recording method (apparatus). With the thermal inkjet recording system, an ink is heated upon ejection to have a low viscosity, and the temperature of the ink decreases when the ink reaches onto a recording medium, leading to a sharp increase in viscosity. This serves to provide the effect of reducing blurring and inter-color bleeding. On the other hand, with the piezo inkjet recording system, a liquid with high viscosity can be ejected and, since the liquid with high viscosity can suppress its spread in the direction of paper surface on a recording medium, it serves to provide the effect of reducing blurring and inter-color bleeding.

In the inkjet recording method (apparatus), replenishment (feeding) of the ink to the head is conducted preferably from an ink tank filled with an ink liquid (including, as needed, a processing solution tank). This ink tank is preferably a cartridge system tank which is removable from the main body of the apparatus. Replenishment of the ink can be conducted with ease by exchanging the cartridge system ink tank.

[Color Toner]

The content of the azo pigment in 100 parts by weight of a color toner is not particularly limited, but is preferably 0.1 part by weight or more, more preferably from 1 to 20 parts by weight, most preferably from 2 to 10 parts by weight. As a binder resin for a color toner into which the azo pigment is to be introduced, any of all binders that are commonly used may be used. Examples thereof include styrene series resins, acryl series resins, styrene/acryl series resins, and polyester resins.

For the purpose of improving flowability or for controlling electrostatic charge, inorganic fine powders or organic fine particles may be externally added to the toner. Silica fine particles and titania fine particles surface-treated with a coupling agent containing an alkyl group are preferably used. Additionally, these have a number-average primary particle size of preferably from 10 to 500 nm, and are added to the toner in a content of preferably from 0.1 to 20% by weight.

As the release agent, any of conventionally used release agents can be used. Specific examples thereof include olefins such as low molecular polypropylene, low molecular polyethylene, and ethylene-propylene copolymer, and waxes such as microcrystalline wax, carnauba wax, sazol wax, and paraffin wax. The addition amount thereof is preferably from 1 to 5% by weight in the toner.

The charge controlling agent may be added as needed and, in view of color forming properties, colorless agents are preferred. Examples thereof include those of quaternary ammonium salt structure and those of calixarene structure.

As the carrier, any of non-coated carriers constituted by particles of magnetic material such as iron or ferrite alone, and resin-coated carriers comprising magnetic material particles whose surface is coated with a resin may be used. The average particle size of the carrier is preferably from 30 to 150 µm in terms of volume-average particle size.

The image-forming method to which the toner of the invention is applied is not particularly limited, and examples thereof include an image-forming method by repeatedly forming a color image and transferring it, and a method of forming a color image by successively transferring an image formed on an electro-photographic photoreceptor onto an intermediate transfer body to form a color image on the intermediate transfer body and transferring the color image onto an image-forming member such as paper.

[Thermally Recording (Transferring) Material]

The thermally recording material is constituted by an ink sheet including a support having coated thereon the pigment of the invention together with a binder, and an image-receiving sheet for immobilizing the pigment traveled in conformity with a thermal energy added from a thermal head according to image-recording signals. The ink sheet can be formed by dispersing the azo pigment of the invention in a solvent together with a binder as fine particles in a solvent to prepare an ink liquid, coating the ink on a support, and properly drying the coated ink. The amount of the ink to be coated on the support is not particularly limited, but is preferably from 30 to 1000 mg/m$^2$. As preferred binder resin, ink solvent, support and, further, an image-receiving sheet, those which are described in JP-A-7-137466 can preferably be used.

In applying the thermally recording material to a thermally recording material capable of recording a full color image, it is preferred to form it by successively coating on a support a cyan ink sheet containing a thermally diffusible cyan colorant which can form a cyan image, a magenta ink sheet containing a thermally diffusible magenta colorant which can form a magenta image, and a yellow ink sheet containing a thermally diffusible yellow colorant which can form a yellow image. Also, an ink sheet containing a black image-forming substance may further be formed as needed.

[Color Filter]

As a method for forming a color filter, there are a method of first forming a pattern by a photo resist and then pigmenting, and a method of forming a pattern by a photo resist containing a colorant as described in JP-A-4-163552, JP-A-4-128703, and JP-A-4-175753. As a method to be employed in the case of introducing the colorant of the invention into a color filter, any of these methods may be employed. As a preferred method, there can be illustrated a method of forming a color filter which comprises exposing through a mask a positive-working composition comprising a thermosetting composition, a quinonediazide compound, a cross-linking agent, a colorant, and a solvent and being coated on a substrate, developing the exposed portion to form a positive resist pattern, exposing the whole positive resist pattern, then curing the exposed resist pattern, as described in JP-A-4-175753 and JP-A-6-35182. Also, an RGB primary color-based color filter or a YMC complementary color-based color filter can be obtained by forming a black matrix according to a conventional manner. With the color filter, too, there are no limits as to the amount of the pigment to be used, but a content of from 0.1 to 50% by weight is preferred.

As to the thermosetting resin, the quinonediazide compound, the cross-linking agent, and the solvent to be used in forming the color filter, and the amounts thereof to be used, those which are described in the aforesaid patent documents can preferably be used.

The present invention is described in more detail with reference to the following examples, but the invention should not be construed as being limited thereto. Additionally, "parts" as used in Examples are by weight.

EXAMPLES

X-ray diffraction of the α crystal form azo pigment is measured according to Japanese Industrial Standards JIS K0131 (General rules for X-ray diffractometric analysis) under the following conditions by using a powder X-ray diffractometer "RINT2500" (trade name; product of Rigaku Corporation) and CuKα radiation.
Measuring apparatus used: automatic X-ray diffractometer, "RINT2500" (trade name; product of Rigaku Corporation)
X-ray tube: Cu
Tube voltage: 55 KV
Tube current: 280 mA
Scanning method: 2θ/θ scan
Scanning rate: 6 deg./min
Sampling interval: 0.100 deg.
Starting angle (2θ): 5 deg.
Stopping angle (2θ): 55 deg.
Divergence slit: 2 deg.
Scattering slit: 2 deg.
Receiving slit: 0.6 mm
An upright goniometer is used.

Synthesis Example 1-1

Synthesis of α-Type Crystal Form Azo Pigment (1)-1

Synthesis scheme of α-type crystal form azo pigment (1)-1 to (1)-12 is shown below.

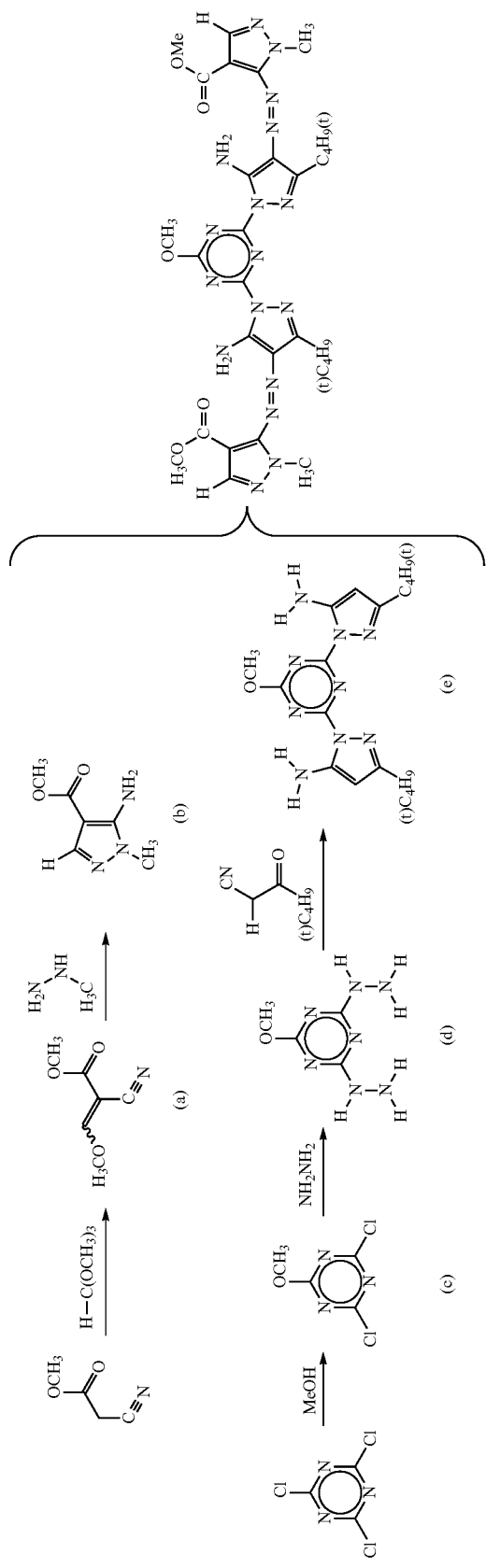

(1) Synthesis of Intermediate (a)

42.4 g (0.4 mol) of trimethyl orthoformate, 20.4 g (0.2 mol) of glacial acetic acid, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to purification by silica gel column chromatography to obtain 14.1 g (yellow powder; yield: 30%) of the intermediate (a). Results of NMR measurement of the thus-obtained intermediate (a) are as follows.

$^1$H-NMR (300 MHz, CDCl$_3$): 7.96 (s, 1H), 4.15 (s, 3H), 3.81 (s, 3H)

(2) Synthesis of Intermediate (b)

150 ml of isopropanol is added to 7.4 ml (141 mmol) of methylhydrazine, followed by cooling to 15° C. (internal temperature). After gradually adding 7.0 g (49.6 mmol) of the intermediate (a) to this solution, the resulting mixture is heated to 50° C. and stirred for 1 hour and 40 minutes. This reaction solution is concentrated under reduced pressure, and is then subjected to purification by silica gel column chromatography to obtain 10.5 g (white powder; yield: 50%) of the intermediate (b). Results of NMR measurement of the thus-obtained intermediate (b) are as follows.

$^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c)

136 mL of water is added to 1.1 L of methanol, and 182 g (2.17 mol) of sodium hydrogencarbonate is added thereto, followed by stirring at room temperature. To the resulting mixture is added 200 g (1.08 mol) of cyanuric chloride by portions. After completion of the addition, the internal temperature is increased to 30° C. After stirring for 30 minutes at the same temperature, 500 mL of water is added thereto, and a precipitated solid product is collected by filtration, spray washed with 500 mL of water and 300 mL of methanol, and dried to obtain 168 g (white powder; yield: 86.2%) of the intermediate (c). Results of NMR measurement of the thus-obtained intermediate (c) are as follows.

$^1$H-NMR (300 MHz, CDCl$_3$): 4.14 (s, 3H)

(4) Synthesis of Intermediate (d)

673 mL of water is added to 363 mL (7.46 mol) of hydrazine monohydrate, and the resulting mixture is cooled to 10° C. (internal temperature) and, after gradually adding to this mixed solution 168 g (934 mmol) of the intermediate (c) (at an internal temperature of 20° C. or lower), the ice bath is removed, and the temperature of the reaction solution is allowed to increase to room temperature, followed by stirring for 30 minutes at the same temperature. Crystals precipitated from the reaction solution are collected by filtration, spray washed with 700 mL of water and 1 L of acetonitrile, and dried to obtain the intermediate (d) (white powder).

(5) Synthesis of Intermediate (e)

480 mL of ethylene glycol is added to a crudely purified product of the intermediate (d), and the mixture is stirred at room temperature. To this suspension is added 257 g (2.06 mol) of pivaloylacetonitrile, and the resulting mixture is heated till the internal temperature reaches 50° C. After dropwise adding thereto a 12M hydrochloric acid aqueous solution at the same temperature to adjust pH of the mixture to 3, the mixture is heated to an internal temperature of 80° C., followed by stirring for 3 hours. After completion of the reaction, the reaction solution is cooled with ice to an internal temperature of 8° C., and the precipitated crystals are collected by filtration, spray washed with water, and subjected to purification by silica gel chromatography to obtain 105 g (white powder; yield through two steps: 29.2%). Results of NMR measurement of the thus-obtained intermediate (e) are as follows.

$^1$H-NMR (300 MHz, d-DMSO): 7.00 (s, 4H), 5.35 (s, 2H), 4.05 (s, 3H), 5.35 (s, 2H), 1.22 (s, 18H)

(6) Synthesis of α-Type Crystal form Azo Pigment (1)-1

20.5 mL of acetic acid is cooled with ice to an internal temperature of 10° C. 16.8 g of nitrosylfulfic acid is added with keeping the internal temperature at 15° C. or lower, and successively 9.5 g of the intermediate (b) is added thereto by portions with keeping the internal temperature at 15° C. or lower. After stirring for 15 minutes at an internal temperature of 15° C., the internal temperature is increased to 25° C. in 15 minutes. After stirring for 90 minutes at the same temperature, 0.4 g of urea is added by portions at the same temperature, followed by stirring for 15 minutes at the same temperature to obtain a diazonium salt solution.

Separately, 11.6 g of the intermediate (e) is completely dissolved in 405 mL of methanol at room temperature, and then the solution is cooled with ice to an internal temperature of −3° C. At the same temperature, the above-described diazonium salt solution is added thereto by portions with keeping the internal temperature at 3° C. or lower and, after completion of the addition, the mixture is stirred for 2 hours to obtain an azo compound reaction solution. Separately, 810 mL of water is prepared, and the azo compound reaction solution is added thereto. The resulting mixture is stirred for 30 minutes at room temperature, and crystals precipitated are collected by filtration, spray-washed with 150 mL of methanol and, further, with 100 mL of water. The thus-obtained crystals are suspended in 750 mL of water without drying, and a 8-N potassium hydroxide aqueous solution is added thereto to adjust the pH to 5.7. After stirring for 20 minutes at room temperature, resulting crystals are collected by filtration, sufficiently spray-washed with water, and then spray-washed with 80 mL of methanol to obtain a crude pigment (1-1). The thus-obtained crude pigment (1-1) is dried for 12 hours at room temperature to obtain a crude pigment (1-2).

Visual observation of the thus-obtained crude pigment (1-2) under a transmission microscope (manufactured by JEOL Ltd.; JEM-1010 electron microscope) reveals that the length of the long axis of primary particles is from about 40 to about 500 nm.

When X-ray diffraction of the crude pigment (1-2) is measured under the above-described conditions, characteristic X-ray peaks are shown at Bragg angles (2θ±0.2°) of 7.2°, 13.4°, 15.0°, and 25.9°.

The X-ray diffraction pattern with characteristic Cu Kα line is shown in FIG. 1.

10 g of the thus-obtained crude pigment (1-2) is suspended in 100 mL of 2-propanol, followed by stirring for 2 hours under reflux. Thereafter, thus-formed crystals are collected by hot filtration, and dried for 12 hours at room temperature to obtain 9.2 g (yield: 92.0%) of α-type crystal form azo pigment (1)-1 having the crystal form of the invention and being represented by formula (1).

Visual observation of the thus-obtained α-type crystal form azo pigment (1)-1 under a transmission microscope (manufactured by JEOL Ltd.; JEM-1010 electron microscope) reveals that the length of the long axis of primary particles is from about 40 to about 180 nm When X-ray diffraction of the α-type crystal form azo pigment (1)-1 is measured under the above-described conditions, characteristic X-ray peaks are shown at Bragg angles (2θ±0.2°) of 7.2°, 13.4°, 15.0°, and 25.9°.

Figure 2:
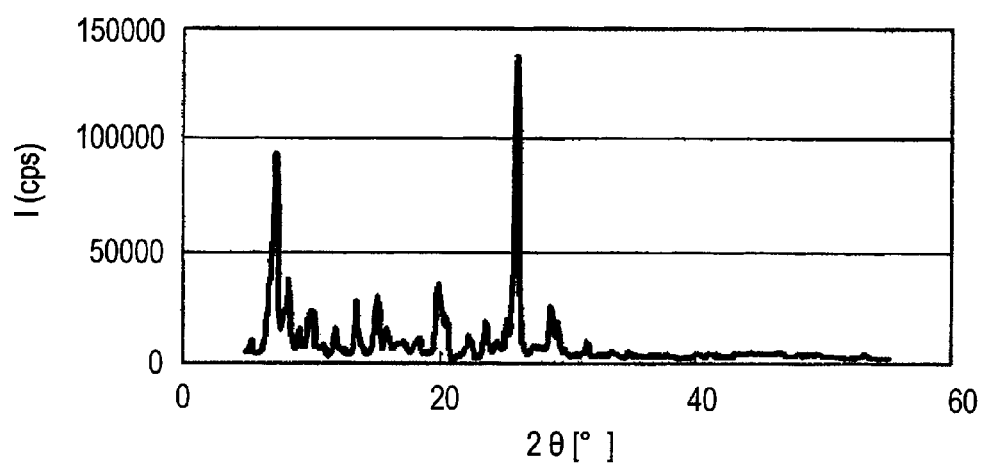
FIG. 2 is an X-ray diffraction pattern of an α-type crystal form pigment (1)-1 synthesized according to Synthesis Example 1-1.

The X-ray diffraction pattern with characteristic Cu Kα line is shown in FIG. 2.

Synthesis Example 1-2

Synthesis of α-Type Crystal Form Azo Pigment (1)-2

10 g of the crude pigment (1-2) obtained in Synthesis Example 1-1 is suspended in a mixed solvent of 50 mL of 2-propanol and 50 mL of water, followed by stirring for 2 hours at an internal temperature of 78° C. Thereafter, thus-formed crystals are collected by hot filtration, and dried for 12 hours at room temperature to obtain 9.5 g (yield: 95.0%) of α-type crystal form azo pigment (1)-2 having the crystal form of the invention and being represented by formula (1).

Visual observation of the thus-obtained α-type crystal form azo pigment (1)-2 under a transmission microscope (manufactured by JEOL Ltd.; JEM-1010 electron microscope) reveals that the length of the long axis of primary particles is from about 40 to about 160 nm.

When X-ray diffraction of the α-type crystal form azo pigment (1)-2 is measured under the above-described conditions, characteristic X-ray peaks are shown at Bragg angles (2θ±0.2°) of 7.2°, 13.4°, 15.0°, and 25.9°.

Figure 3:
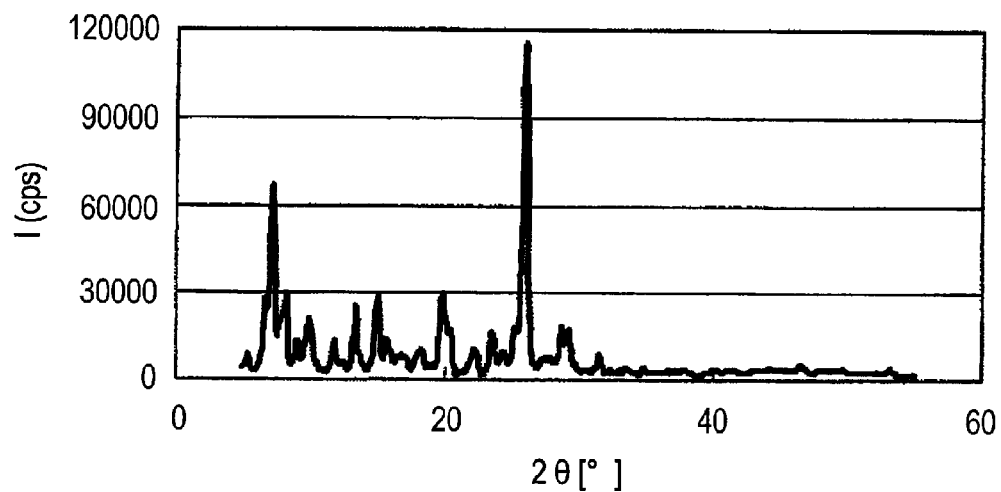
FIG. 3 is an X-ray diffraction pattern of an α-type crystal form pigment (1)-2 synthesized according to Synthesis Example 1-2.

The X-ray diffraction pattern with characteristic Cu Kα line is shown in FIG. 3.

Synthesis Example 1-3

Synthesis of α-Type Crystal Form Azo Pigment (1)-3

10 g of the crude pigment (1-2) obtained in Synthesis Example 1-1 is suspended in 200 mL of 2-methyl-1-propanol, followed by stirring for 2 hours at an internal temperature of 80° C. Thereafter, thus-formed crystals are collected by hot filtration, and dried for 12 hours at room temperature to obtain 9.3 g (yield: 93.0%) of α-type crystal form azo pigment (1)-3 having the crystal form of the invention and being represented by formula (1).

Visual observation of the thus-obtained α-type crystal form azo pigment (1)-3 under a transmission microscope (manufactured by JEOL Ltd.; JEM-1010 electron microscope) reveals that the length of the long axis of primary particles is from about 30 to about 140 nm.

When X-ray diffraction of the α-type crystal form azo pigment (1)-3 is measured under the above-described conditions, characteristic X-ray peaks are shown at Bragg angles (2θ±0.2°) of 7.2°, 13.4°, 15.0°, and 25.9°.

Figure 4:
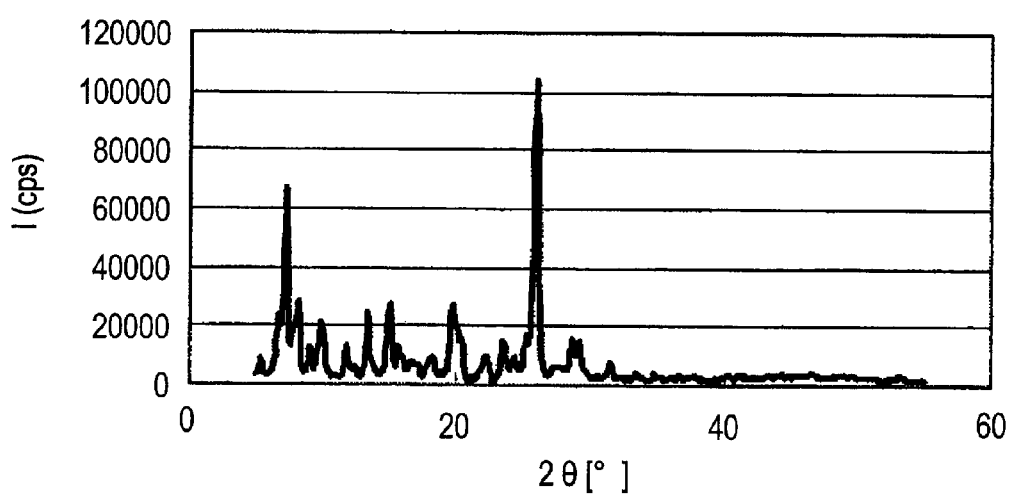
FIG. 4 is an X-ray diffraction pattern of an α-type crystal form pigment (1)-3 synthesized according to Synthesis Example 1-3.

The X-ray diffraction pattern with characteristic Cu Kα line is shown in FIG. 4.

Synthesis Example 1-4

Synthesis of α-Type Crystal Form Azo Pigment (1)-4

10 g of the crude pigment (1-2) obtained in Synthesis Example 1-1 is suspended in a mixed solvent of 50 mL of 2-methyl-1-propanol and 50 mL of water, followed by stirring for 2 hours at an internal temperature of 80° C. Thereafter, thus-formed crystals are collected by hot filtration, and dried for 12 hours at room temperature to obtain 9.3 g (yield: 93.0%) of α-type crystal form azo pigment (1)-4 having the crystal form of the invention and being represented by formula (1).

Visual observation of the thus-obtained α-type crystal form azo pigment (1)-4 under a transmission microscope (manufactured by JEOL Ltd.; JEM-1010 electron microscope) reveals that the length of the long axis of primary particles is from about 40 to about 120 nm.

When X-ray diffraction of the α-type crystal form azo pigment (1)-4 is measured under the above-described conditions, characteristic X-ray peaks are shown at Bragg angles (2θ±0.2°) of 7.2°, 13.4°, 15.0°, and 25.9°.

Figure 5:
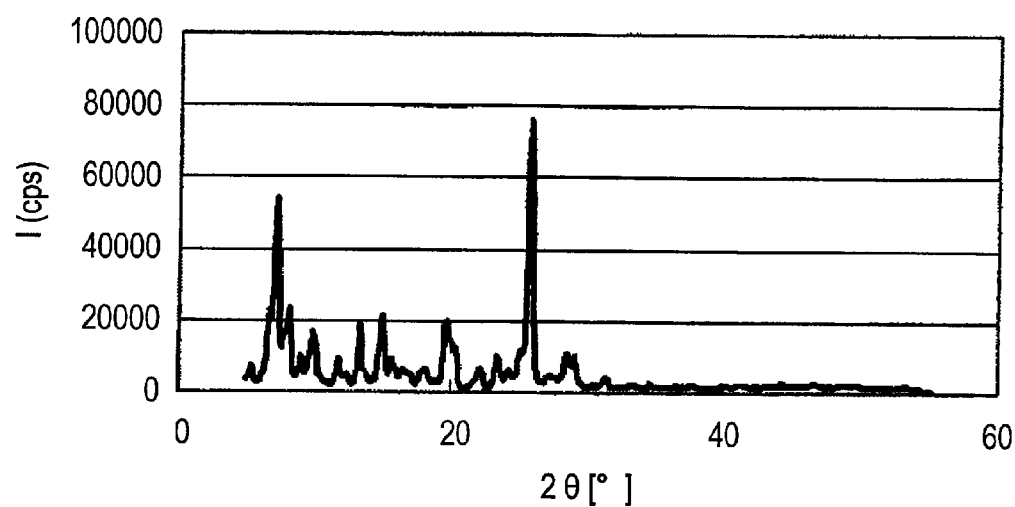
FIG. 5 is an X-ray diffraction pattern of an α-type crystal form pigment (1)-4 synthesized according to Synthesis Example 1-4.

The X-ray diffraction pattern with characteristic Cu Kα line is shown in FIG. 5.

Synthesis Example 1-5

Synthesis of α-Type Crystal from Azo Pigment (1)-5

10 g of the crude pigment (1-2) obtained in Synthesis Example 1-1 is suspended in a mixed solvent of 25 mL of 2-methyl-1-propanol and 75 mL of water, followed by stirring for 2 hours at an internal temperature of 80° C. Thereafter, thus-formed crystals are collected by hot filtration, and dried for 12 hours at room temperature to obtain 9.3 g (yield: 93.0%) of α-type crystal form azo pigment (1)-5 having the crystal form of the invention and being represented by formula (1).

Visual observation of the thus-obtained α-type crystal form azo pigment (1)-5 under a transmission microscope (manufactured by JEOL Ltd.; JEM-1010 electron microscope) reveals that the length of the long axis of primary particles is from about 30 to about 110 nm.

When X-ray diffraction of the α-type crystal form azo pigment (1)-5 is measured under the above-described conditions, characteristic X-ray peaks are shown at Bragg angles (2θ±0.2°) of 7.2°, 13.4°, 15.0°, and 25.9°.

Figure 6:
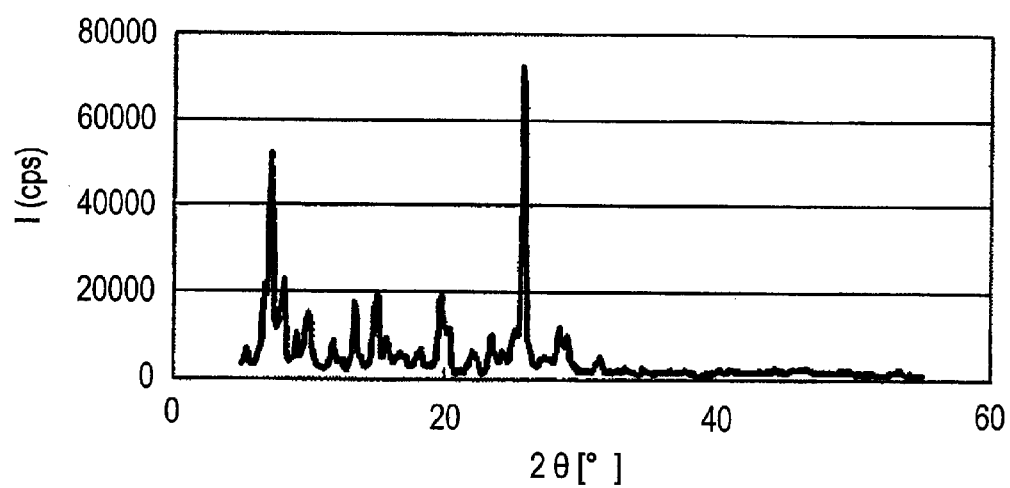
FIG. 6 is an X-ray diffraction pattern of an α-type crystal form pigment (1)-5 synthesized according to Synthesis Example 1-5.

The X-ray diffraction pattern with characteristic Cu Kα line is shown in FIG. 6.

Synthesis Example 1-6

Synthesis of α-Type Crystal Form Azo Pigment (1)-6

10 g of the crude pigment (1-2) obtained in Synthesis Example 1-1 is suspended in 200 mL of water, followed by stirring for 2 hours at an internal temperature of 80° C. Thereafter, thus-formed crystals are collected by hot filtration, and dried for 12 hours at room temperature to obtain 9.6 g (yield: 96.0%) of α-type crystal form azo pigment (1)-6 having the crystal form of the invention and being represented by formula (1).

Visual observation of the thus-obtained α-type crystal form azo pigment (1)-6 under a transmission microscope (manufactured by JEOL Ltd.; JEM-1010 electron microscope) reveals that the length of the long axis of primary particles is from about 30 to about 150 nm.

When X-ray diffraction of the α-type crystal form azo pigment (1)-6 is measured under the above-described conditions, characteristic X-ray peaks are shown at Bragg angles (2θ±0.2°) of 7.2°, 13.4°, 15.0°, and 25.9°.

Figure 7:
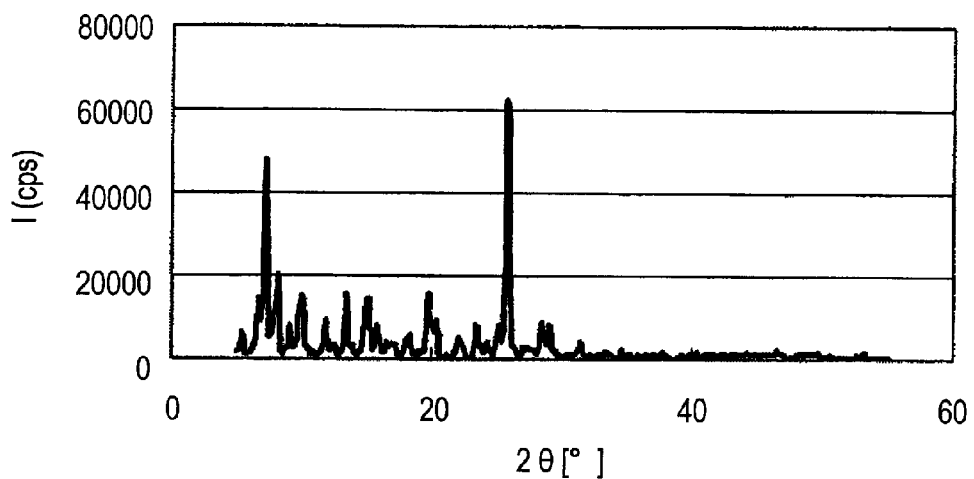
FIG. 7 is an X-ray diffraction pattern of an α-type crystal form pigment (1)-6 synthesized according to Synthesis Example 1-6.

The X-ray diffraction pattern with characteristic Cu Kα line is shown in FIG. 7.

Synthesis Example 1-7

Synthesis of α-Type Crystal Form Azo Pigment (1)-7

10 g of the crude pigment (1-2) obtained in Synthesis Example 1-1 is suspended in 200 mL of acetone, followed by stirring for 2 hours under reflux. Thereafter, thus-formed crystals are collected by hot filtration, and dried for 12 hours at room temperature to obtain 8.5 g (yield: 85.0%) of α-type crystal form azo pigment (1)-7 having the crystal form of the invention and being represented by formula (1).

Visual observation of the thus-obtained α-type crystal form azo pigment (1)-7 under a transmission microscope (manufactured by JEOL Ltd.; JEM-1010 electron microscope) reveals that the length of the long axis of primary particles is from about 60 to about 190 nm.

When X-ray diffraction of the α-type crystal form azo pigment (1)-7 is measured under the above-described conditions, characteristic X-ray peaks are shown at Bragg angles (2θ±0.2°) of 7.2°, 13.4°, 15.0°, and 25.9°.

Figure 8:
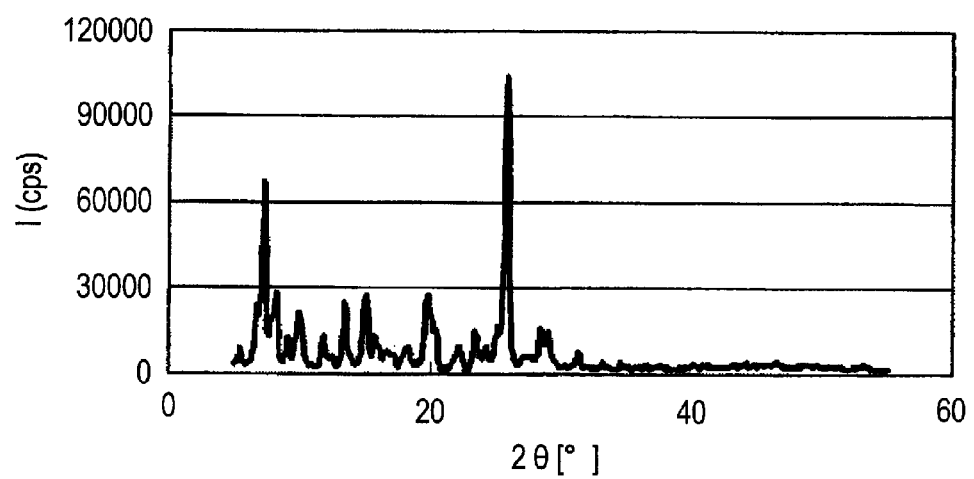
FIG. 8 is an X-ray diffraction pattern of an α-type crystal form pigment (1)-7 synthesized according to Synthesis Example 1-7.

The X-ray diffraction pattern with characteristic Cu Kα line is shown in FIG. 8.

Synthesis Example 1-8

Synthesis of α-Type Crystal Form Azo Pigment (1)-8

10 g of the crude pigment (1-2) obtained in Synthesis Example 1-1 is suspended in a mixed solvent of 100 mL of acetone and 100 mL of water, followed by stirring for 2 hours at an internal temperature of 60° C. Thereafter, thus-formed crystals are collected by hot filtration, and dried for 12 hours at room temperature to obtain 9.0 g (yield: 90.0%) of α-type crystal form azo pigment (1)-8 having the crystal form of the invention and being represented by formula (1).

Visual observation of the thus-obtained α-type crystal form azo pigment (1)-8 under a transmission microscope (manufactured by JEOL Ltd.; JEM-1010 electron microscope) reveals that the length of the long axis of primary particles is from about 50 to about 160 nm.

When X-ray diffraction of the α-type crystal form azo pigment (1)-8 is measured under the above-described conditions, characteristic X-ray peaks are shown at Bragg angles (2θ±0.2°) of 7.2°, 13.4°, 15.0°, and 25.9°.

Figure 9:
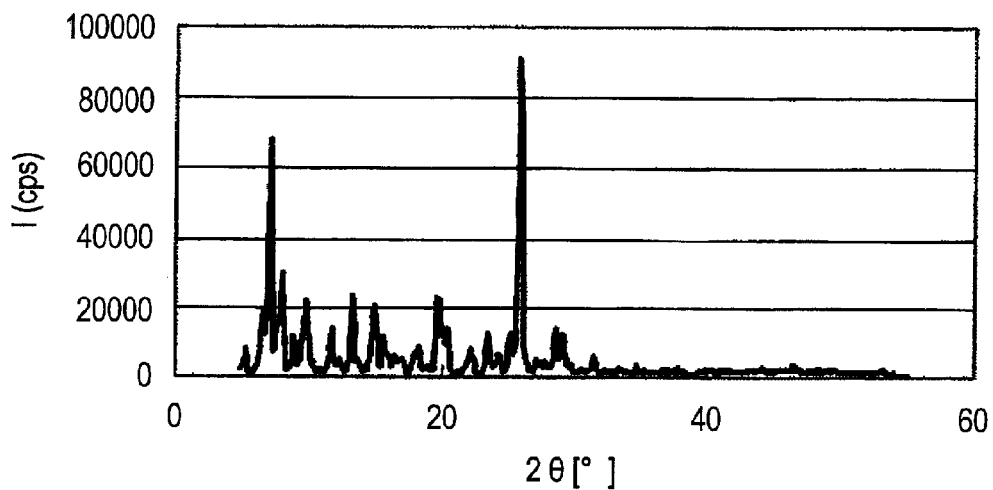
FIG. 9 is an X-ray diffraction pattern of an α-type crystal form pigment (1)-8 synthesized according to Synthesis Example 1-8.

The X-ray diffraction pattern with characteristic Cu Kα line is shown in FIG. 9.

Synthesis Example 1-9

Synthesis of α-Type Crystal Form Azo Pigment (1)-9

10 g of the crude pigment (1-2) obtained in Synthesis Example 1-1 is suspended in 100 mL of methanol, followed by stirring for 2 hours under reflux. Thereafter, thus-formed crystals are collected by hot filtration, and dried for 12 hours at room temperature to obtain 9.2 g (yield: 92.0%) of α-type crystal form azo pigment (1)-9 having the crystal form of the invention and being represented by formula (1).

Visual observation of the thus-obtained α-type crystal form azo pigment (1)-9 under a transmission microscope (manufactured by JEOL Ltd.; JEM-1010 electron microscope) reveals that the length of the long axis of primary particles is from about 50 to about 140 nm.

When X-ray diffraction of the α-type crystal form azo pigment (1)-9 is measured under the above-described conditions, characteristic X-ray peaks are shown at Bragg angles (2θ±0.2°) of 7.2°, 13.4°, 15.0°, and 25.9°.

Figure 10:
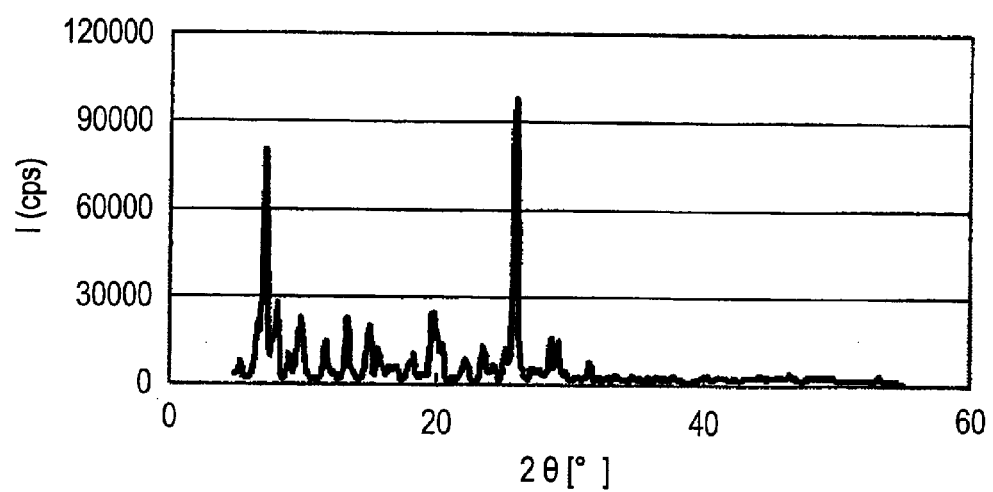
FIG. 10 is an X-ray diffraction pattern of an α-type crystal form pigment (1)-9 synthesized according to Synthesis Example 1-9.

The X-ray diffraction pattern with characteristic Cu Kα line is shown in FIG. 10.

Synthesis Example 1-10

Synthesis of α-Type Crystal Form Azo Pigment (1)-10

10 g of the crude pigment (1-2) obtained in Synthesis Example 1-1 is suspended in a mixed solvent of 100 mL of methanol and 100 mL of water, followed by stirring for 2 hours at an internal temperature of 70° C. Thereafter, thus-formed crystals are collected by hot filtration, and dried for 12 hours at room temperature to obtain 9.4 g (yield: 94.0%) of α-type crystal form azo pigment (1)-10 having the crystal form of the invention and being represented by formula (1).

Visual observation of the thus-obtained α-type crystal form azo pigment (1)-10 under a transmission microscope (manufactured by JEOL Ltd.; JEM-1010 electron microscope) reveals that the length of the long axis of primary particles is from about 40 to about 130 nm.

When X-ray diffraction of the α-type crystal form azo pigment (1)-10 is measured under the above-described conditions, characteristic X-ray peaks are shown at Bragg angles (2θ±0.2°) of 7.2°, 13.4°, 15.0°, and 25.9°.

Figure 11:
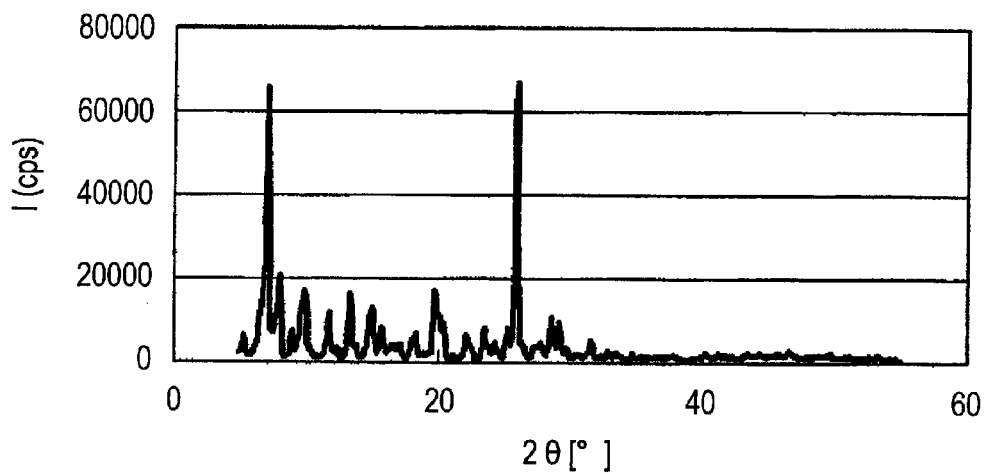
FIG. 11 is an X-ray diffraction pattern of an α-type crystal form pigment (1)-10 synthesized according to Synthesis Example 1-10.

The X-ray diffraction pattern with characteristic Cu Kα line is shown in FIG. 11.

Synthesis Example 1-11

Synthesis of α-Type Crystal Form Azo Pigment (1)-11

43.3 g of 43% nistosylsulfuric acid is cooled with ice to an internal temperature of 10° C. 60 mL of acetic acid is added with keeping the internal temperature at 15° C. or lower, and successively 25 g of the intermediate (b) is added thereto by portions with keeping the internal temperature at 15° C. or lower. After stirring for 15 minutes at an internal temperature of 15° C., the internal temperature is increased to 25° C., and the mixture is stirred for 90 minutes at the same temperature. Thereafter, 0.9 g of urea is added by portions at the same temperature, followed by stirring for 15 minutes at the same temperature to obtain a diazonium salt solution. Separately, 30.3 g of the intermediate (e) is suspended in 518 mL of methanol at room temperature, and then the solution is cooled to an internal temperature of 15° C. At the same temperature, the above-described diazonium salt solution is added thereto with keeping the internal temperature at 30° C. or lower. After completion of the addition, the mixture is stirred for 2 hours to obtain an azo compound reaction solution. Separately, 810 mL of water is prepared, and the azo compound reaction solution is added thereto. The resulting mixture is stirred for 30 minutes at room temperature, and a 8-N sodium hydroxide aqueous solution is added thereto to adjust the pH to 6.0. Thereafter, stirring is discontinued, the supernatant is removed, and water is added thereto in the same amount as that of the removed supernatant, followed by stirring for 30 minutes. After repeating this procedure 3 times, the internal temperature is increased to 80° C., followed by stirring for 2 hours at the same temperature. Thereafter, hot filtration is conducted, and crystals obtained are spray-washed with 1 L of water, and dried for 24 hours under reduced pressure at room temperature to obtain 53.4 g (yield: 97.1%) of α-type crystal form azo pigment (1)-11.

Visual observation of the thus-obtained α-type crystal form azo pigment (1)-11 under a transmission microscope (manufactured by JEOL Ltd.; JEM-1010 electron microscope) reveals that the length of the long axis of primary particles is from about 60 to about 250 nm.

When X-ray diffraction of the crude pigment (1)-11 is measured under the above-described conditions, characteristic X-ray peaks are shown at Bragg angles (2θ±0.2°) of 7.2°, 13.4°, 15.0°, and 25.9°.

Figure 12:
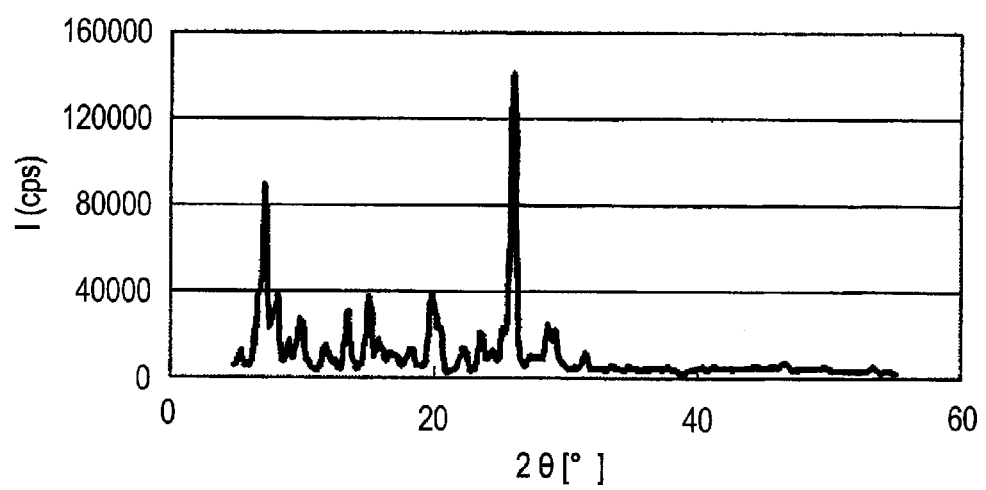
FIG. 12 is an X-ray diffraction pattern of an α-type crystal form pigment (1)-11 synthesized according to Synthesis Example 1-11.

The X-ray diffraction pattern with characteristic Cu Kα line is shown in FIG. 12.

Synthesis Example 1-12

Synthesis of α-Type Crystal Form Azo Pigment (1)-12

10 g of the crude pigment (1-2) obtained in Synthesis Example 1-1 is suspended in a mixed solvent of 100 mL of N,N-dimethylacetamide and 100 mL of water, followed by stirring for 2 hours at an internal temperature of 80° C. Thereafter, thus-formed crystals are collected by hot filtration, and dried for 12 hours at room temperature to obtain 9.0 g (yield: 90.0%) of α-type crystal form azo pigment (1)-12 having the crystal form of the invention and being represented by formula (1).

Visual observation of the thus-obtained α-type crystal form azo pigment (1)-12 under a transmission microscope (manufactured by JEOL Ltd.; JEM-1010 electron microscope) reveals that the length of the long axis of primary particles is from about 60 nm to about 2 μm.

When X-ray diffraction of the α-type crystal form azo pigment (1)-12 is measured under the above-described conditions, characteristic X-ray peaks are shown at Bragg angles (2θ±0.2°) of 7.2°, 13.4°, 15.0°, and 25.9°.

Figure 13:
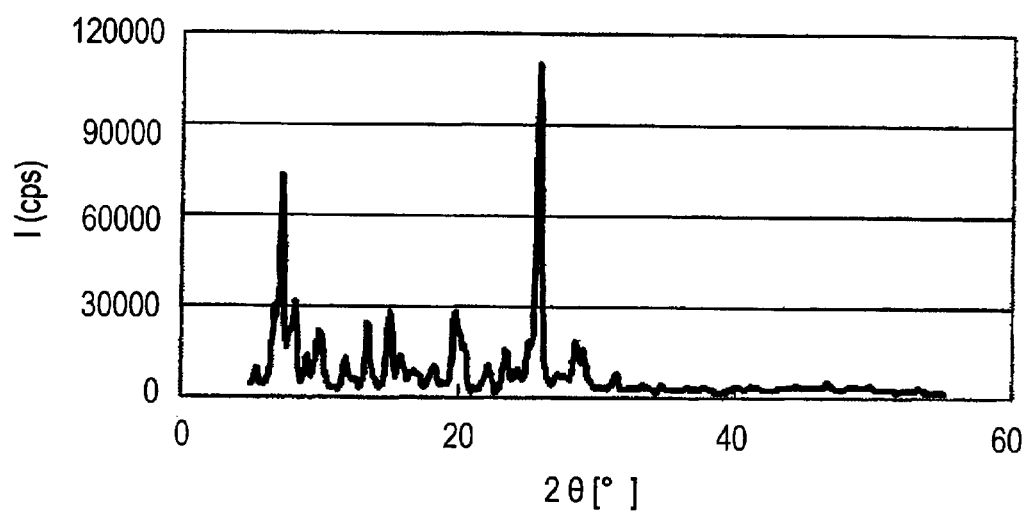
FIG. 13 is an X-ray diffraction pattern of an α-type crystal form pigment (1)-12 synthesized according to Comparative Synthesis Example 1-12.

The X-ray diffraction pattern with characteristic Cu Kα line is shown in FIG. 13.

TABLE 1

| | | Primary Particle Size |
|---|---|---|
| Synthesis Example 1-1 | crude pigment (1-2) | 40-500 nm |
| Synthesis Example 1-1 | α-type crystal form azo pigment (1)-1 | 40-180 nm |
| Synthesis Example 1-2 | α-type crystal form azo pigment (1)-2 | 40-160 nm |
| Synthesis Example 1-3 | α-type crystal form azo pigment (1)-3 | 30-140 nm |
| Synthesis Example 1-4 | α-type crystal form azo pigment (1)-4 | 40-120 nm |
| Synthesis Example 1-5 | α-type crystal form azo pigment (1)-5 | 30-110 nm |
| Synthesis Example 1-6 | α-type crystal form azo pigment (1)-6 | 30-150 nm |
| Synthesis Example 1-7 | α-type crystal form azo pigment (1)-7 | 60-190 nm |
| Synthesis Example 1-8 | α-type crystal form azo pigment (1)-8 | 50-160 nm |
| Synthesis Example 1-9 | α-type crystal form azo pigment (1)-9 | 50-140 nm |
| Synthesis Example 1-10 | α-type crystal form azo pigment (1)-10 | 40-130 nm |
| Synthesis Example 1-11 | α-type crystal form azo pigment (1)-11 | 60-250 nm |
| Synthesis Example 1-12 | α-type crystal form azo pigment (1)-12 | 60 nm-2 μm |

Example 1

Preparation of Pigment Dispersion 1

2.5 parts of the α-type crystal form azo pigment (1)-1 synthesized in Synthesis Example 1-1, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 1 (volume-average particle size: Mv=ca. 90.3 nm; measured by using Nanotrac 150 (UPA-EX150) manufactured by Nikkiso Co., Ltd.).

Example 2

Preparation of Pigment Dispersion 2

2.5 parts of the α-type crystal form azo pigment (1)-6 synthesized in Synthesis Example 1-6, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 2 (volume-average particle size: Mv=ca. 70.1 nm; measured by using Nanotrac 150 (UPA-EX150) manufactured by Nikkiso Co., Ltd.).

Example 3

Preparation of Pigment Dispersion 3

2.5 parts of the α-type crystal form azo pigment (1)-6 synthesized in Synthesis Example 1-6, 0.5 part of sodium oleate, 5 parts of glycerin, and 42 parts of water are mixed with each other, followed by dispersing for 3 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 3 (volume-average particle size: Mv=ca. 65.2 nm; measured by using Nanotrac 150 (UPA-EX150) manufactured by Nikkiso Co., Ltd.).

Example 4

Preparation of Pigment Dispersion 4

2.5 parts of the α-type crystal form azo pigment (1)-6 synthesized in Synthesis Example 1-6, 0.5 part of sodium oleate, 5 parts of glycerin, and 42 parts of water are mixed with each other, followed by dispersing for 4 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 4 (volume-average particle size: Mv=ca. 45.9 nm; measured by using Nanotrac 150 (UPA-EX150) manufactured by Nikkiso Co., Ltd.).

Example 5

Preparation of Pigment Dispersion 5

2.5 parts of the α-type crystal form azo pigment (1)-2 synthesized in Synthesis Example 1-2, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 5 (volume-average particle size: Mv=ca. 71.3 nm; measured by using Nanotrac 150 (UPA-EX150) manufactured by Nikkiso Co., Ltd.).

Example 6

Preparation of Pigment Dispersion 6

2.5 parts of the α-type crystal form azo pigment (1)-3 synthesized in Synthesis Example 1-3, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 6 (volume-average particle size: Mv=ca. 75.2 nm; measured by using Nanotrac 150 (UPA-EX150) manufactured by Nikkiso Co., Ltd.).

Example 7

Preparation of Pigment Dispersion 7

2.5 parts of the α-type crystal form azo pigment (1)-4 synthesized in Synthesis Example 1-4, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 7 (volume-average particle size: Mv=ca. 69.2 nm; measured by using Nanotrac 150 (UPA-EX150) manufactured by Nikkiso Co., Ltd.).

Example 8

Preparation of Pigment Dispersion 8

2.5 parts of the α-type crystal form azo pigment (1)-5 synthesized in Synthesis Example 1-5, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 8 (volume-average particle size: Mv=ca. 62.8 nm; measured by using Nanotrac 150 (UPA-EX150) manufactured by Nikkiso Co., Ltd.).

Example 9

Preparation of Pigment Dispersion 9

2.5 parts of the α-type crystal form azo pigment (1)-7 synthesized in Synthesis Example 1-7, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 9 (volume-average particle size: Mv=ca. 85.4 nm; measured by using Nanotrac 150 (UPA-EX150) manufactured by Nikkiso Co., Ltd.).

Example 10

Preparation of Pigment Dispersion 10

2.5 parts of the α-type crystal form azo pigment (1)-8 synthesized in Synthesis Example 1-8, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 10 (volume-average particle size: Mv=ca. 78.8 nm; measured by using Nanotrac 150 (UPA-EX150) manufactured by Nikkiso Co., Ltd.).

Example 11

Preparation of Pigment Dispersion 11

2.5 parts of the α-type crystal form azo pigment (1)-9 synthesized in Synthesis Example 1-9, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 11 (volume-average particle size: Mv=ca. 70.9 nm; measured by using Nanotrac 150 (UPA-EX150) manufactured by Nikkiso Co., Ltd.).

Example 12

Preparation of Pigment Dispersion 12

2.5 parts of the α-type crystal form azo pigment (1)-10 synthesized in Synthesis Example 1-10, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 12 (volume-average particle size: Mv=ca. 64.7 nm; measured by using Nanotrac 150 (UPA-EX150) manufactured by Nikkiso Co., Ltd.).

Example 13

Preparation of Pigment Dispersion 13

2.5 parts of the α-type crystal form azo pigment (1)-11 synthesized in Synthesis Example 1-11, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 13 (volume-average particle size: Mv=ca. 87.3 nm; measured by using Nanotrac 150 (UPA-EX150) manufactured by Nikkiso Co., Ltd.).

Example 14

Preparation of Pigment Dispersion 14

2.5 parts of the α-type crystal form azo pigment (1)-11 synthesized in Synthesis Example 1-11, 0.5 part of sodium oleate, 5 parts of glycerin, and 42 parts of water are mixed with each other, followed by dispersing for 2 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 14 (volume-average particle size: Mv=ca. 67.9 nm; measured by using Nanotrac 150 (UPA-EX150) manufactured by Nikkiso Co., Ltd.).

Example 15

Preparation of Pigment Dispersion 15

2.5 parts of the crude pigment (1-2) synthesized in Synthesis Example 1-1, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 15 (volume-average particle size: Mv=ca. 79.2 nm; measured by using Nanotrac 150 (UPA-EX150) manufactured by Nikkiso Co., Ltd.).

Example 16

Preparation of Pigment Dispersion 16

2.5 parts of the α-type crystal form azo pigment (1)-12 synthesized in Synthesis Example 1-12, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After completion of the dispersing procedure, the zirconia beads are removed to obtain a yellow pigment dispersion 16 (volume-average particle size: Mv=ca. 122.9 nm; measured by using Nanotrac 150 (UPA-EX150) manufactured by Nikkiso Co., Ltd.).

Example 17

Preparation of Pigment Dispersion 17

2.5 parts of the α-type crystal form azo pigment (1)-12 synthesized in Synthesis Example 1-12, 0.5 part of sodium oleate, 5 parts of glycerin, and 42 parts of water are mixed with each other, followed by dispersing for 2 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 17 (volume-average particle size: My=ca. 64.0 nm; measured by using Nanotrac 150 (UPA-EX150) manufactured by Nikkiso Co., Ltd.).

Comparative Example 1

Preparation of Comparative Pigment Dispersion 1

A yellow comparative pigment dispersion 1 is obtained in the same manner as in Example 1 except for using C.I. Pigment Yellow 74 (Iralite YELLOW GO manufactured by Ciba Specialty Chemicals) in place of the α-type crystal form azo pigment composition (1)-1 used in Example 1.

Comparative Example 2

Preparation of Comparative Pigment Dispersion 2

A yellow comparative pigment dispersion 2 is obtained in the same manner as in Example 1 except for using C.I. Pigment Yellow 155 (INKJET YELLOW 4G VP2532 manufactured by Clariant Co.) in place of the α-type crystal form azo pigment composition (1) used in Example 1.

Comparative Example 3

Preparation of Comparative Pigment Dispersion 3

When the same dispersing procedures as in Example 1 are conducted except for using a compound (DYE-1) represented by the following formula in place of the α-type crystal form azo pigment (1)-1 used in Example 1, the compound is dissolved, with no dispersion being obtained.

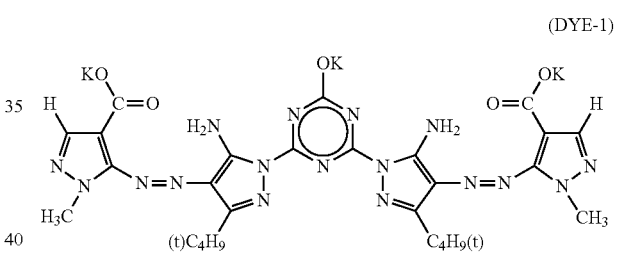

(DYE-1)

TABLE 2

|  | Pigment | Dispersing Time | Volume-Average Particle Size |
| --- | --- | --- | --- |
| Example 1 | α-type crystal form azo pigment (1)-1 | 1 hour and 30 minutes | 90.3 nm |
| Example 2 | α-type crystal form azo pigment (1)-6 | 1 hour and 30 minutes | 70.1 nm |
| Example 3 | α-type crystal form azo pigment (1)-6 | 3 hours | 65.2 nm |
| Example 4 | α-type crystal form azo pigment (1)-6 | 4 hours | 45.9 nm |
| Example 5 | α-type crystal form azo pigment (1)-2 | 1 hour and 30 minutes | 71.3 nm |
| Example 6 | α-type crystal form azo pigment (1)-3 | 1 hour and 30 minutes | 75.2 nm |
| Example 7 | α-type crystal form azo pigment (1)-4 | 1 hour and 30 minutes | 69.2 nm |
| Example 8 | α-type crystal form azo pigment (1)-5 | 1 hour and 30 minutes | 62.8 nm |
| Example 9 | α-type crystal form azo pigment (1)-7 | 1 hour and 30 minutes | 85.4 nm |
| Example 10 | α-type crystal form azo pigment (1)-8 | 1 hour and 30 minutes | 78.8 nm |
| Example 11 | α-type crystal form azo pigment (1)-9 | 1 hour and 30 minutes | 70.9 nm |

TABLE 2-continued

|  | Pigment | Dispersing Time | Volume-Average Particle Size |
|---|---|---|---|
| Example 12 | α-type crystal form azo pigment (1)-10 | 1 hour and 30 minutes | 64.7 nm |
| Example 13 | α-type crystal form azo pigment (1)-11 | 1 hour and 30 minutes | 87.3 nm |
| Example 14 | α-type crystal form azo pigment (1)-11 | 2 hours | 67.9 nm |
| Example 15 | crude pigment (1-2) | 1 hour and 30 minutes | 79.2 nm |
| Example 16 | α-type crystal form azo pigment (1)-12 | 1 hour and 30 minutes | 122.9 nm |
| Example 17 | α-type crystal form azo pigment (1)-12 | 2 hours | 64.0 nm |

<Dispersibility>

2.5 parts of a pigment, 0.5 part of sodium oleate, 5 parts of glycerin, and 42 parts of water are mixed with each other, followed by dispersing for 1 hour and 30 minutes at a speed of 300 rotations per minute using a planetary ball mill containing 100 parts of zirconia beads of 0.1 mm in diameter. After this dispersing procedure, the pigment dispersion 3, pigment dispersion 13, pigment dispersion 16, comparative pigment dispersion 1, comparative pigment dispersion 2, and comparative dye dispersion 3 are evaluated according to the following criteria: a sample found to contain almost no coarse particles of 200 nm or larger is ranked A, and a sample which is dissolved in an aqueous solvent or which fails to be dispersed due to gelation of the dispersion is ranked D. Further, a sample which is found to contain coarse particles of 200 nm or larger when dispersed for 1 hour and 30 minutes but is found to contain almost no coarse particles of 200 nm or larger when dispersed for 4 hours is ranked B, and a sample which is found to contain coarse particles of 200 nm or larger even when dispersed for 2 hours is ranked C. The results are shown in Table 3.

<Storage Stability of Pigment Dispersion>

The pigment dispersions obtained in the above-described Example 3, Example 13, Example 16, Comparative Example 1, Comparative Example 2, and Comparative Example 3 are allowed to stand at room temperature for 3 weeks. As a result, a sample which is found to form a precipitate is ranked B, and a sample which is found to form no precipitate is ranked A. The results are shown in Table 3.

<Evaluation of Tinctorial Strength>

Each of the pigment dispersions obtained in the above-described Example 3, Example 13, Example 16, Comparative Example 1, Comparative Example 2, and Comparative Example 3 is coated on Epson Photo Matte Paper using a No. 3 bar coater. Image density of each of the thus-obtained coated products is measured by means of a reflection densitometer (X-Rite 938; manufactured by X-Rite Co.). "Tinctorial strength (OD: Optical Density)" is evaluated according to the following criteria: a sample showing an OD of 1.4 or more is ranked A; a sample showing an OD of 1.2 or more and less than 1.4 is ranked B, and a sample showing an OD less than 1.2 is ranked C. The results are shown in Table 3.

<Evaluation of Hue>

Hue is evaluated according to the following criteria: a sample of the above-obtained coated product which is less reddish and have large vividness in terms of chromaticity when viewed with the eye are ranked A; a sample which is reddish or have less vividness is ranked B. The results are shown in Table 3.

<Evaluation of Light Fastness>

The coated products of 1.0 in image density used in evaluation of hue are prepared and irradiated for 28 days with a xenon light (99,000 lux; in the presence of a TAC filter) using a fadeometer, and image density thereof is measured before and after irradiation with the xenon light. The pigment dispersion 3, the pigment dispersion 13, the pigment dispersion 16, the comparative pigment dispersion 1, the comparative pigment dispersion 2, and the comparative pigment dispersion 3 are evaluated in terms of colorant residual ratio [(density after irradiation/density before irradiation)×100%] according to the following criteria: a sample with a colorant residual ratio of 80% or more is ranked A; a sample with a colorant residual ratio of 60% or more and less than 80% are ranked B; and samples with a colorant residual ratio of less than 60% are ranked C. The results are shown in Table 3.

TABLE 3

|  | Dispersibility | Storage stability of dispersions | Tinctorial strength | Light fastness | Hue |
|---|---|---|---|---|---|
| Present invention (pigment dispersion 3) | A | A | A | A | A |
| Present invention (pigment dispersion 13) | B | A | A | A | A |
| Present invention (pigment dispersion 16) | B | A | A | A | A |
| PY-74 (Comparative pigment dispersion 1) | C | A | A | C | A |
| P.Y.-155 (Comparative pigment dispersion 2) | C | A | B | B | B |
| DYE-1 (Comparative pigment dispersion 3) | D | — | — | — | — |

Industrial Applicability

According to the present invention, there is provided an azo pigment showing excellent coloring characteristics such as tinctorial strength, having stable pigment particle size with the lapse of time, and showing excellent pigment storage stability of dispersions and ink liquid stability. A pigment dispersion showing excellent coloring characteristics and showing excellent storage stability of dispersions and ink liquid stability can be obtained by dispersing the pigment of the invention in various media. The pigment dispersion can be used in, for example, an ink for printing such as inkjet printing, a color toner for electro-photography, a color filter to be used for displays such as LCD and PDP and photographing devices such as CCD, a paint, and in colored plastics.

Although the invention has been described in detail and by reference to specific embodiments, it is apparent to those skilled in the art that it is possible to add various alterations and modifications insofar as the alterations and modifications do not deviate from the spirit and the scope of the invention.

The invention claimed is:

1. An azo pigment which is represented by the following formula (1) and having characteristic peaks at Bragg angles (2θ±0.2°) of 7.2°, 13.4, 15.0°, and 25.9 in X-ray diffraction with characteristic Cu Kα line, or a tautomer thereof:

Formula (1):

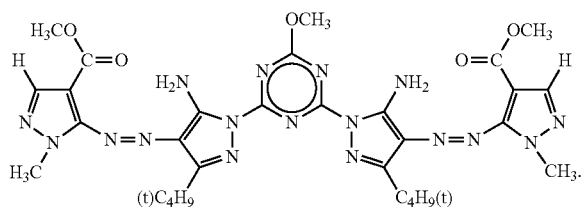

2. A process for producing an azo pigment represented by the following formula (1) or a tautomer thereof, comprising: conducting diazo coupling reaction between a diazonium salt derived from a heterocyclic amine represented by the following formula (2) and a compound represented by the following formula (3):

Formula (2):

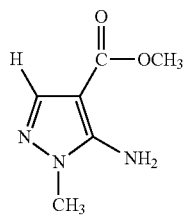

Formula (3):

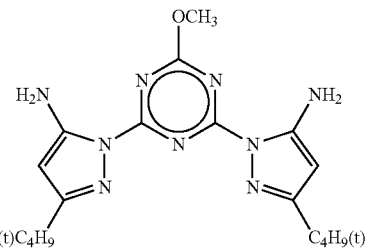

Formula (1):

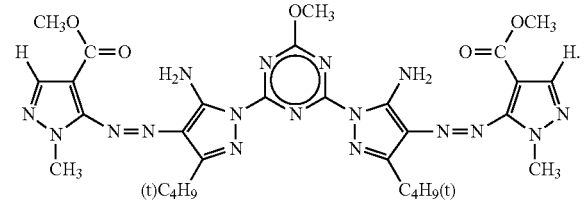

3. The production process according to claim 2, further comprising conducting after-treatment.

4. The production process according to claim 2, wherein the azo pigment obtained by the production process according to claim 2 is successively subjected to an after-treatment without isolation.

5. The azo pigment according to claim 1, which is produced by the production process, comprising conducting diazo coupling reaction between a diazonium salt derived from a heterocyclic amine represented by the following formula (2) and a compound represented by the following formula (3):

Formula (2):

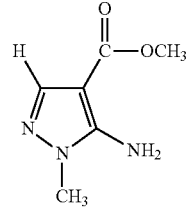

Formula (3):

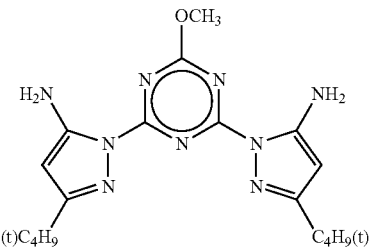

wherein the diazo coupling reaction is conducted after dissolving the compound represented by the formula (3) in an organic solvent.

6. A pigment dispersion comprising an azo pigment according to claim 1.

7. The pigment dispersion according to claim 6, wherein the pigment particles in the pigment dispersion has a volume-average particle size of from 0.01 μm to 0.15 μm.

8. A coloring composition comprising an azo pigment according to claim 1.

9. A coloring composition comprising a pigment dispersion according to claim 6.

* * * * *